United States Patent
Koga et al.

(10) Patent No.: US 12,015,742 B2
(45) Date of Patent: Jun. 18, 2024

(54) IMAGE FORMING APPARATUS, INFORMATION PROCESSING APPARATUS, AND METHOD OF GIVING NOTIFICATION OF CAUSAL PART

(71) Applicant: CANON KABUSHIKI KAISHA, Tokyo (JP)

(72) Inventors: Katsuhide Koga, Ibaraki (JP); Shinya Suzuki, Chiba (JP); Manabu Jimba, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/487,912

(22) Filed: Oct. 16, 2023

(65) Prior Publication Data
US 2024/0129412 A1    Apr. 18, 2024

(30) Foreign Application Priority Data

Oct. 18, 2022  (JP) ................................ 2022-166716

(51) Int. Cl.
*H04N 1/00*        (2006.01)
(52) U.S. Cl.
CPC ..... *H04N 1/00039* (2013.01); *H04N 1/00344* (2013.01)

(58) Field of Classification Search
CPC ............ H04N 1/00039; H04N 1/00344; G06F 3/1229; G06F 3/1234
USPC ....................................................... 358/1.14
See application file for complete search history.

(56) References Cited

U.S. PATENT DOCUMENTS

| 10,025,657 | B2   | 7/2018 | Oku et al. |         |
|------------|------|--------|------------|---------|
| 11,886,140 | B2 * | 1/2024 | Suzuki     | G03G 15/553 |
| 2018/0234746 | A1 * | 8/2018 | Uchida   | G08B 29/02 |

* cited by examiner

*Primary Examiner* — Kent Yip
(74) *Attorney, Agent, or Firm* — Canon U.S.A., Inc. I.P. Division

(57) ABSTRACT

There is provided an information processing apparatus for communicating with a database storing information on errors which have occurred in an image forming apparatus. The information processing apparatus includes a controller configured to acquire, from the database, information on an error to be analyzed and information on a related error which occurred before an occurrence of the error to be analyzed, and determine a causal part being a cause of the error to be analyzed, based on error timing information related to a timing of occurrence of the error to be analyzed and error timing information related to a timing of occurrence of the related error.

15 Claims, 19 Drawing Sheets

| ERROR CODE | DETECTION CONTENTS | PHENOMENON | FAILURE MODE | CAUSAL PART | OPERATION PERIOD (NUMBER OF PRINTED SHEETS) UNTIL REOCCURRENCE |
|---|---|---|---|---|---|
| E001 | EVEN THOUGH CONTAINER DRIVE UNIT IS DRIVEN TO ROTATE IN REVERSE DIRECTION, OPEN STATE OF CONTAINER REPLACEMENT DOOR CANNOT BE DETECTED BY OPEN/CLOSE DETECTION SENSOR | CONTAINER REPLACEMENT DOOR DOES NOT OPEN | A | CONTAINER DRIVE UNIT | 10 SHEETS OR LESS |
| | | | B | LINK MEMBER, LINK SHAFT | |
| | | OPEN/CLOSE DETECTION SENSOR CANNOT DETECT OPEN STATE | C | OPEN/CLOSE DETECTION SENSOR | MORE THAN 10 SHEETS |

FIG. 9

| DATE AND TIME OF OCCURRENCE | CUMULATIVE NUMBER OF PRINTED SHEETS | ERROR CODE |
|---|---|---|
| 2022/6/1 12:00 | 100010 | E001 |
| 2022/6/2 10:00 | 100110 | E001 |
| 2022/6/2 10:05 | 100110 | E002 |

FIG. 10

| No. | ERROR-TO-BE -ANALYZED CODE | RELATED-ERROR CODE | DETERMINATION RANGE | FAILURE PATTERN | CAUSAL PART |
|---|---|---|---|---|---|
| 1 | E001 | E001 | 10 SHEETS OR LESS | SUCCESSIVE | · CONTAINER DRIVE UNIT<br>· LINK MEMBER AND LINK SHAFT |
| 2 | E001 | E001 | MORE THAN 10 SHEETS AND EQUAL TO OR LESS THAN 1000 SHEETS | INTERMITTENT | · OPEN/CLOSE DETECTION SENSOR |
| 3 | E001 | E001 | NO OCCURRENCE IN 1000 SHEETS OR LESS | NO OCCURRENCE | · CONTAINER DRIVE UNIT<br>· LINK MEMBER AND LINK SHAFT<br>· OPEN/CLOSE DETECTION SENSOR |

FIG. 12

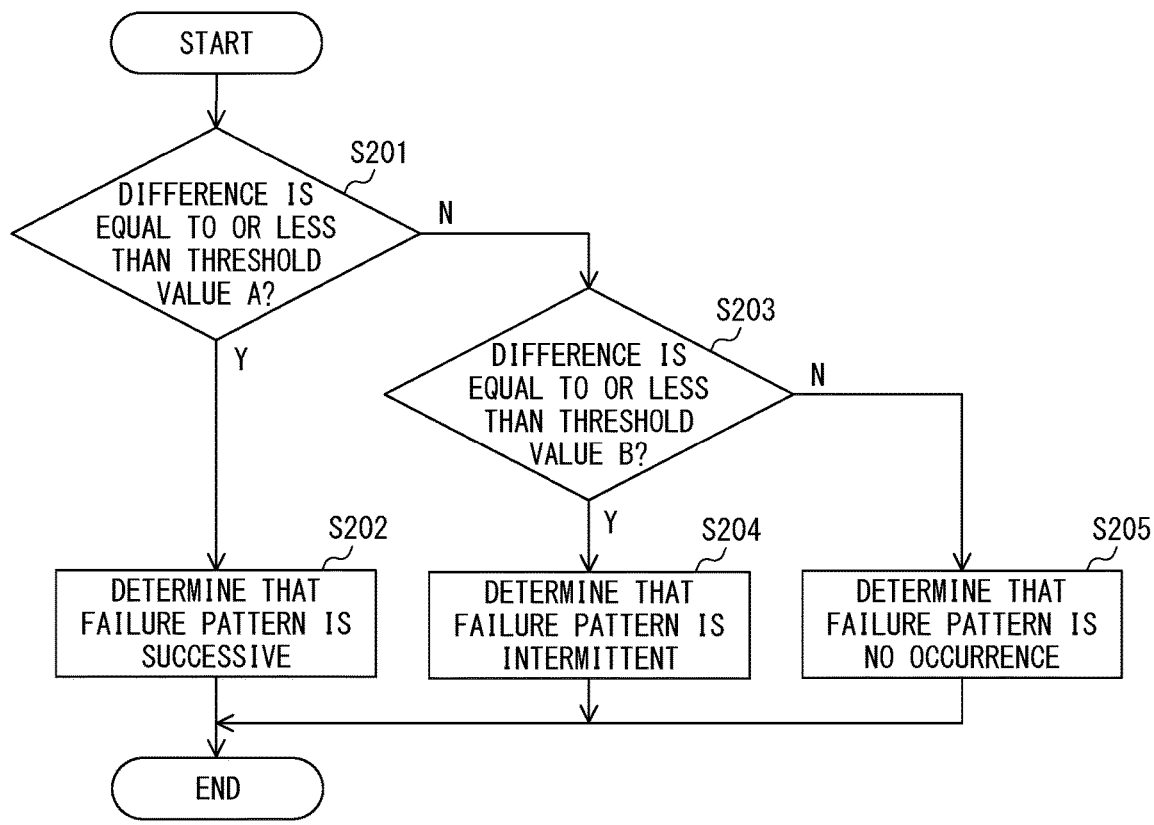
FIG. 14
FIG. 15A
| HISTORY No. | DATE AND TIME OF OCCURRENCE | CUMULATIVE NUMBER OF PRINTED SHEETS | ERROR CODE |
|---|---|---|---|
| E1 | 2022/6/1 12:00 | 100010 | E001 |
| E2 | 2022/6/2 10:00 | 100050 | E001 |
| E3 | 2022/6/2 14:05 | 100110 | E001 |
FIG. 15B
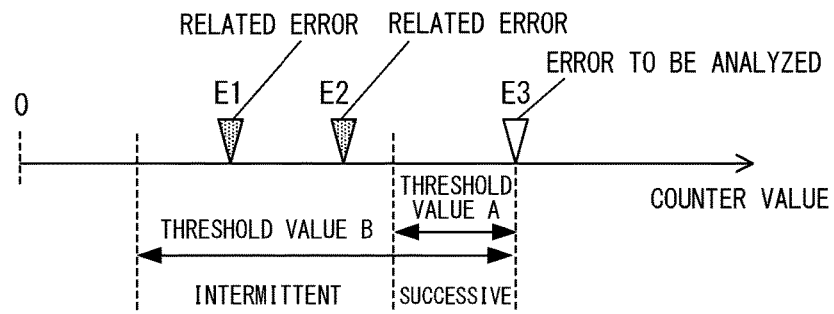

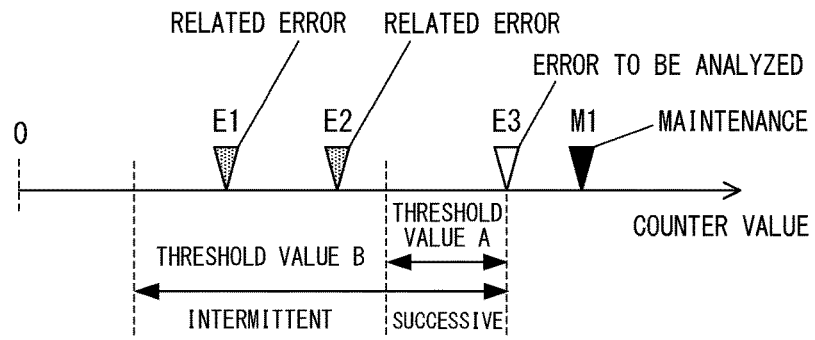
FIG. 15C
FIG. 15D
| HISTORY No. | DATE AND TIME OF OCCURRENCE | CUMULATIVE NUMBER OF PRINTED SHEETS | ERROR CODE |
|---|---|---|---|
| E1 | 2022/6/1 12:00 | 100010 | E001 |
| E2 | 2022/6/2 10:00 | 100050 | E001 |
| E3 | 2022/6/2 14:05 | 100110 | E001 |
| M1 | 2022/6/2 15:00 | 100112 | E001 |
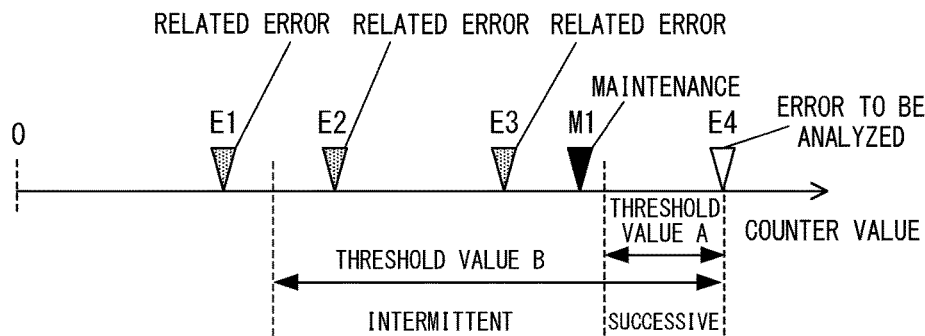
FIG. 15E
FIG. 15F
| HISTORY No. | DATE AND TIME OF OCCURRENCE | CUMULATIVE NUMBER OF PRINTED SHEETS | ERROR CODE |
|---|---|---|---|
| E1 | 2022/6/1 12:00 | 100010 | E001 |
| E2 | 2022/6/2 10:00 | 100050 | E001 |
| E3 | 2022/6/2 14:05 | 100110 | E001 |
| M1 | 2022/6/2 15:00 | 100112 | E001 |
| E4 | 2022/6/4 14:10 | 101030 | E001 |

| HISTORY No. | DATE AND TIME OF OCCURRENCE | CUMULATIVE NUMBER OF PRINTED SHEETS | ERROR CODE |
|---|---|---|---|
| E1 | 2022/6/1 12:00 | 100010 | E001 |
| E2 | 2022/6/2 10:00 | 100050 | E001 |
| E3 | 2022/6/2 14:05 | 100110 | E001 |
| M1 | 2022/6/2 15:00 | 100112 | E001 |
| E4 | 2022/6/4 14:10 | 101030 | E001 |
MASKING (E1, E2, E3)
FIG. 16A
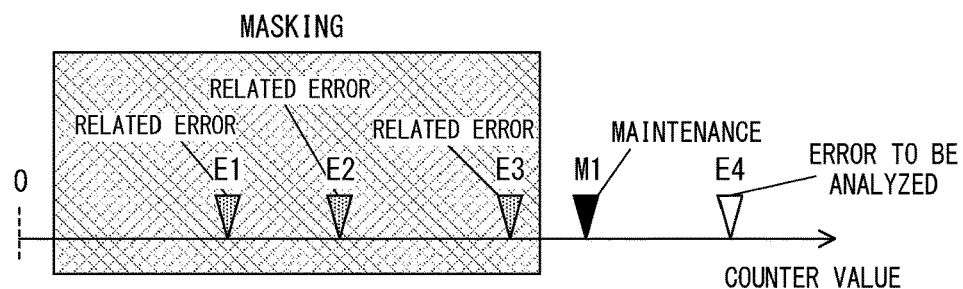
FIG. 16B
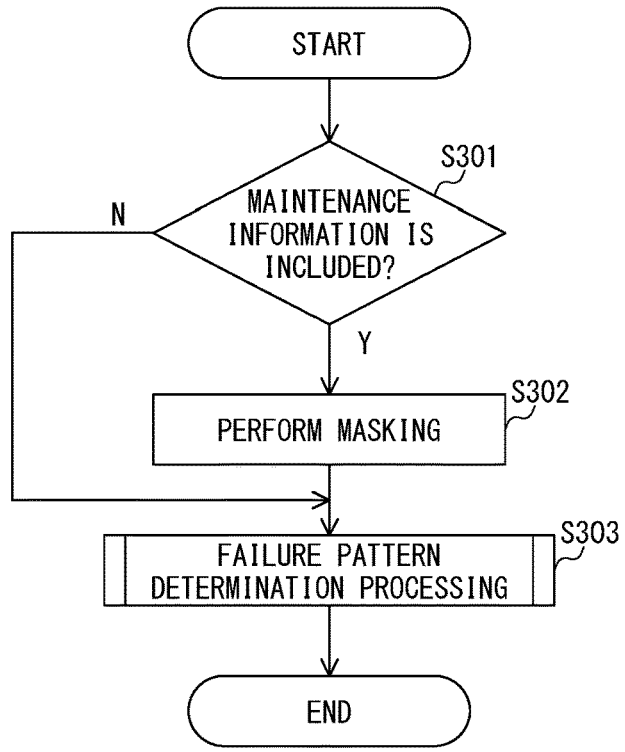
FIG. 16C

| HISTORY No. | DATE AND TIME OF OCCURRENCE | CUMULATIVE NUMBER OF PRINTED SHEETS | ERROR CODE |
|---|---|---|---|
| E1 | 2022/6/1 12:00 | 100010 | E001 |
| E2 | 2022/6/2 10:00 | 101050 | E001 |
| E3 | 2022/6/2 14:05 | 101055 | E001 |
| M1 | 2022/6/2 15:00 | 101057 | E001 |
| E4 | 2022/6/2 15:05 | 101060 | E001 |

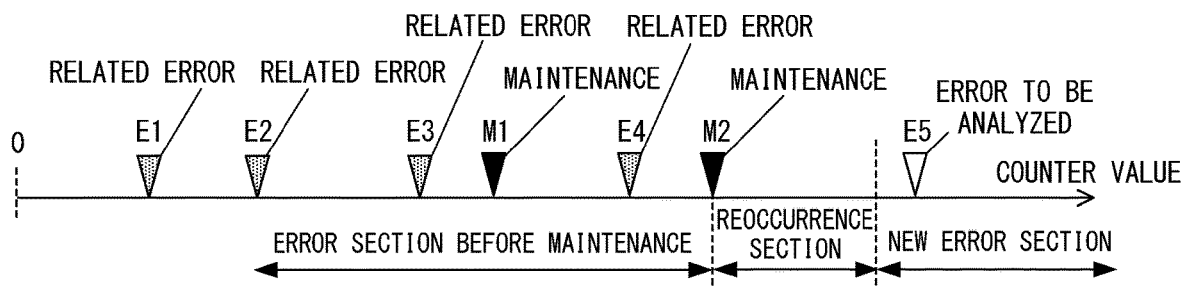
FIG. 17C
| HISTORY No. | DATE AND TIME OF OCCURRENCE | CUMULATIVE NUMBER OF PRINTED SHEETS | ERROR CODE |
|---|---|---|---|
| E1 | 2022/6/1 12:00 | 100010 | E001 |
| E2 | 2022/6/2 10:00 | 101050 | E001 |
| E3 | 2022/6/2 14:05 | 101055 | E001 |
| M1 | 2022/6/2 15:00 | 101057 | E001 |
| E4 | 2022/6/2 15:05 | 101060 | E001 |
| M2 | 2022/6/2 17:00 | 101060 | E001 |
| E5 | 2022/6/4 14:10 | 101080 | E001 |
FIG. 17D
| HISTORY No. | DATE AND TIME OF OCCURRENCE | CUMULATIVE NUMBER OF PRINTED SHEETS | ERROR CODE |
|---|---|---|---|
| E1 | 2022/6/1 12:00 | 100010 | E001 |
| E2 | 2022/6/2 10:00 | 101050 | E001 |
| E3 | 2022/6/2 14:05 | 101055 | E001 |
| M1 | 2022/6/2 15:00 | 101057 | E001 |
| E4 | 2022/6/2 15:05 | 101060 | E001 |
| M2 | 2022/6/2 17:00 | 101060 | E001 |
| E5 | 2022/6/4 14:10 | 101080 | E001 |
MASKING (rows E1–E4)
FIG. 17E
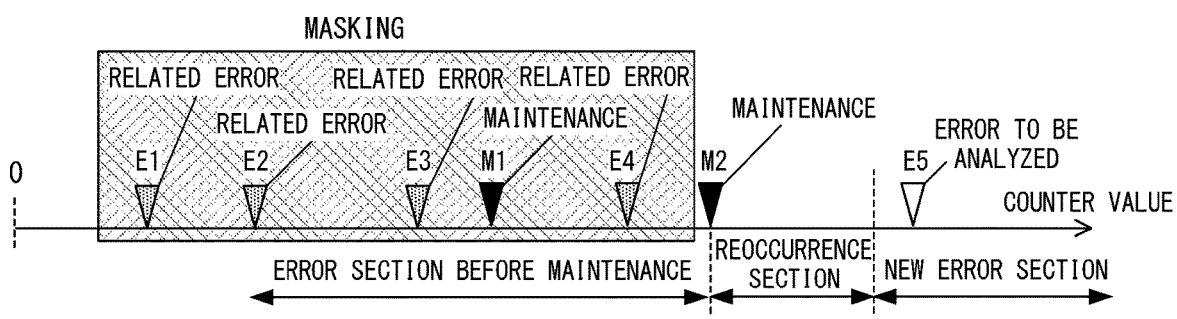
FIG. 17F

IMAGE FORMING APPARATUS, INFORMATION PROCESSING APPARATUS, AND METHOD OF GIVING NOTIFICATION OF CAUSAL PART

BACKGROUND

Field of the Disclosure

The present disclosure relates to an image forming apparatus, such as a copying machine, a multifunctional peripheral, a printer, or a fax machine, and a management system for an image forming apparatus.

Description of the Related Art

An image forming apparatus experiencing a failure is repaired by a customer engineer (hereinafter referred to as "CE") who visits a place in which the image forming apparatus is installed. How long it takes to identify a cause of the failure and finish correctly dealing with the failure varies depending on the CE's capability. A time required for the CE to repair the image forming apparatus consequently varies. In order to shorten the time required for the repair, a technology for deducing a cause of a failure based on in-machine data indicating a state of an image forming apparatus and notifying required processing has been proposed (U.S. Pat. No. 10,025,657). The in-machine data is information indicating a state inside the image forming apparatus, for example, a detected value obtained by a sensor provided in the image forming apparatus, or error occurrence information.

After maintenance of a causal part corresponding to the cause of the failure is performed, when an occurrence history of this error is left, there is a possibility that occurrence information on the solved error is referred to again. In this case, the causal part that has been subjected to maintenance is deduced as the causal part again. This deduction causes occurrence of needless maintenance work.

SUMMARY

An information processing apparatus, according to the present disclosure, for communicating with a database storing information on errors which have occurred in an image forming apparatus, the information processing apparatus includes a controller configured to acquire, from the database, information on an error to be analyzed and information on a related error which occurred before an occurrence of the error to be analyzed, and determine a causal part being a cause of the error to be analyzed, based on error timing information related to a timing of occurrence of the error to be analyzed and error timing information related to a timing of occurrence of the related error, wherein in a case where, after maintenance has been performed to solve a first error to be analyzed, a second error to be analyzed of a same type as the first error to be analyzed has occurred, the controller determines a period before a time of an occurrence of the second error to be analyzed, the second error to be analyzed being for use in determination of a causal part that has caused the second error to be analyzed, based on a timing at which the maintenance is performed; and determine the causal part being the cause of the second error to be analyzed based on error timing information related to a timing of occurrence of the related error occurring within the determined period.

An image forming apparatus according to the present disclosure includes a memory in which information on errors which have occurred in the image forming apparatus and error timing information related to a timing of occurrence of each of the errors are to be stored, and a controller configured to read out, from the memory, information on an error to be analyzed and information on a related error which has occurred before an occurrence of the error to be analyzed, and determine a causal part being a cause of the error to be analyzed, based on error timing information related to a timing of occurrence of the error to be analyzed and error timing information related to a timing of occurrence of the related error, wherein the controller is configured to determine, in a case where, after maintenance has been performed in order to solve a first error to be analyzed, a second error to be analyzed which is an error of a same type as the first error to be analyzed has occurred, the controller determines a period before a time of an occurrence of the second error to be analyzed, the second error to be analyzed being for use in determination of a causal part that has caused the second error to be analyzed, based on a timing at which the maintenance is performed, and determine the causal part being the cause of the second error to be analyzed based on error timing information related to a timing of occurrence of the related error occurring within a determined period.

A notification method of giving a notification of a causal part being a cause of an error which has occurred in an image forming apparatus of the present disclosure includes selecting information on an error to be analyzed from a database storing information on errors which have occurred in the image forming apparatus, determining whether maintenance has been performed in order to solve the errors which have occurred in the image forming apparatus, determining, in a case where the maintenance has been performed in order to solve an error of a same type as the error to be analyzed before a timing of occurrence of the error to be analyzed, a threshold period occurring before the timing of occurrence of the error to be analyzed and is to be used in determination of a causal part being a cause of the error to be analyzed, acquiring information on a related error occurring in the threshold period, from the database, and giving a notification of the causal part being the cause of the error to be analyzed, based on error timing information related to the timing of occurrence of the error to be analyzed and error timing information related to a timing of occurrence of the related error.

Further features of the present disclosure will become apparent from the following description of embodiments (with reference to the attached drawings).

BRIEF DESCRIPTION OF THE DRAWINGS

FIG. 9 is an explanatory table of error codes.

FIG. 10 is a table of error-related information.

FIG. 12 is a diagram of a causal part deduction table.

FIG. 14 is a flow chart for illustrating processing of determining the failure pattern.

FIG. 15A, FIG. 15B, FIG. 15C, FIG. 15D, FIG. 15E, and FIG. 15F are explanatory diagrams of processing performed after maintenance.

FIG. 16A, FIG. 16B, and FIG. 16C are explanatory diagrams of the processing performed after the maintenance.

FIG. 17A, FIG. 17B, FIG. 17C, FIG. 17D, FIG. 17E, and FIG. 17F are explanatory diagrams of masking of the error-related information.

DESCRIPTION OF THE EMBODIMENTS

Now, referring to the accompanying drawings, description is given of embodiments of the present disclosure. The present disclosure is more specifically described by way of embodiments, which are examples of the embodiments in the present disclosure. However, the present disclosure is not limited exclusively to configurations of those embodiments.
<Configuration of Image Forming Apparatus>

Figure 1:
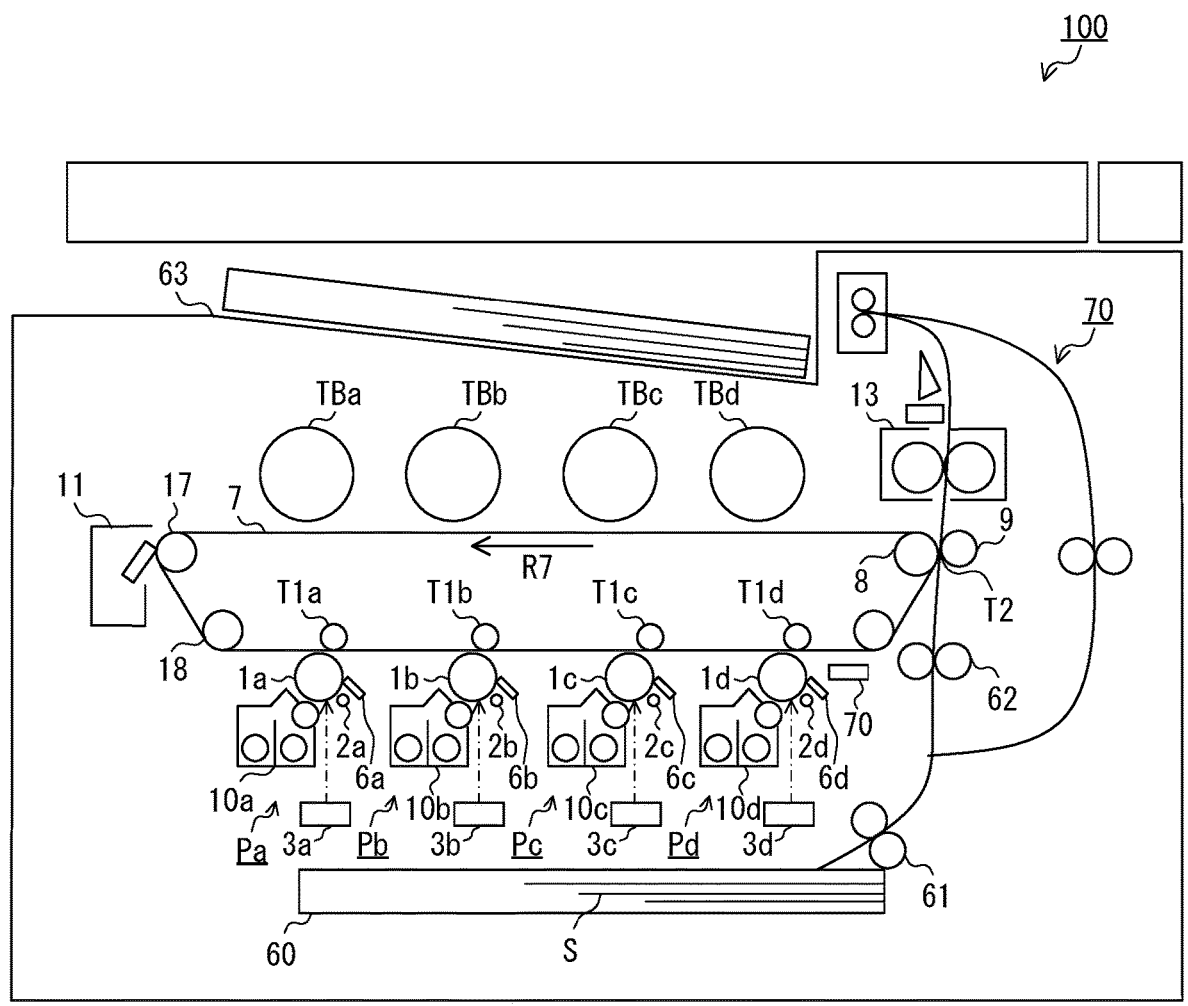
FIG. 1 is a configuration view of an image forming apparatus.

FIG. 1 is a configuration view of an image forming apparatus. An image forming apparatus 100 operates through use of an electrophotographic system, and forms a color image onto a sheet S. The image forming apparatus 100 adopts an intermediate transfer tandem system in which a plurality of image forming units are arranged along a surface of an intermediate transfer belt 7 onto which an image is to be transferred. The image forming apparatus 100 includes four image forming units Pa, Pb, Pc, and Pd in order to form images of four colors of yellow, magenta, cyan, and black, respectively. Such an image forming apparatus 100 is achieved by a printer, a copying machine, a multifunctional peripheral, a fax machine, or the like.

The sheet S is stored in a sheet storage 60, and is fed by sheet feeding rollers 61 adopting a friction separating system, in accordance with the timing to form images by the image forming units Pa to Pd. The sheet feeding rollers 61 convey the sheet S fed from the sheet storage 60 to registration rollers 62 through a conveyance path. The registration rollers 62 correct skew feeding of the sheet S, and adjust the timing to convey the sheet S to a secondary transfer portion T2.

The image forming units Pa to Pd are only different from each other in colors of images to be formed, and have similar configurations and perform similar operations to form the images. The image forming units Pa to Pd include photosensitive members 1a to 1d, charging devices 2a to 2d, exposing devices 3a to 3d, developing devices 10a to 10d, primary transfer portions T1a to T1d, and photosensitive member cleaners 6a to 6d, respectively. In the following, when description is given without distinguishing the colors, symbols "a", "b", "c", and "d" at ends of the reference symbols are omitted.

The photosensitive member 1 has a drum shape including a photosensitive layer on its surface, and is driven to rotate about a drum shaft. The charging device 2 uniformly charges the surface of the rotating photosensitive member 1. The exposing device 3 applies light modulated in accordance with image data for the color to be formed onto each of the uniformly-charged surfaces of the photosensitive members 1a to 1d. In this manner, an electrostatic latent image corresponding to the image data is formed on the surface of the photosensitive member 1.

The developing device 10 develops the electrostatic latent image formed on the photosensitive member 1 through use of developer. The developer includes toner. The developing device 10 causes toner to adhere to the electrostatic latent image formed on the photosensitive member 1, to thereby form a toner image on the photosensitive member 1. In the image forming unit Pa, the developing device 10a stores yellow developer so that a yellow toner image is generated. In the image forming unit Pb, the developing device 10b stores magenta developer so that a magenta toner image is generated. In the image forming unit Pc, the developing device 10c stores cyan developer so that a cyan toner image is generated. In the image forming unit Pd, the developing device 10d stores black developer so that a black toner image is generated. The number of colors of toner images to be formed in the image forming apparatus 100 is not limited to four.

Each of the developing devices 10a to 10d stores two-component developer in which non-magnetic toner and magnetic carriers are mixed, but the developer may be a one-component developer containing only magnetic toner or only non-magnetic toner. In each of the developing devices 10a to 10d, when an amount of developer stored therein is reduced to be smaller than a predetermined amount through image formation, the developing device is repeatedly replenished with the developer from a developer storing unit. In the developer storing unit, when the amount of developer stored therein is reduced to be smaller than the predetermined amount, the developer storing unit is repeatedly replenished with developer of a corresponding color from each of developer replenishment containers TBa to TBd serving as a replenishment container of the developer. Details of a configuration of a developer replenishment system formed of the developer replenishment container TB, the developer storing unit, and the developing device 10 are described later.

With the developer replenishment system, each of the developing devices 10a to 10d can have an amount of developer stored therein stabilized with respect to a predetermined reference amount. With the amount of developer stored therein being stabilized, the developing devices 10a to 10d can stabilize toner amounts to be caused to adhere to the photosensitive members 1a to 1d, respectively. Accordingly, toner amounts of toner images to be formed on the respective photosensitive members 1a to 1d are stabilized, and thus image densities are stabilized.

At the primary transfer portion T1, a predetermined amount of pressure in a direction of the intermediate transfer belt 7 and an electrostatic load bias are applied so that a toner image is transferred from each of the photosensitive members 1a to 1d onto the intermediate transfer belt 7. At this time, the toner images formed on the respective photosensitive members 1a to 1d are superimposed on each other on the intermediate transfer belt 7. Toner remaining on the photosensitive members 1a to 1d after the transfer is collected by the photosensitive member cleaners 6a to 6d.

When the toner images of respective colors of yellow, magenta, cyan, and black are transferred onto the intermediate transfer belt 7 in superimposition, the intermediate transfer belt 7 bears multi-color toner images. The intermediate transfer belt 7 is an endless belt which is provided on an intermediate transfer belt frame (not shown), and is stretched by a secondary transfer inner roller 8, a tension roller 17, and a secondary transfer upstream roller 18. The intermediate transfer belt 7 is driven to rotate in a direction of an arrow R7 by the secondary transfer inner roller 8, the tension roller 17, and the secondary transfer upstream roller 18. The intermediate transfer belt 7 having the multi-color toner images transferred thereon is rotated so as to convey those multi-color toner images to the secondary transfer portion T2.

The sheet S and the multi-color toner images formed on the intermediate transfer belt 7 are conveyed at timings matching each other at the secondary transfer portion T2. The secondary transfer portion T2 is a transfer nip portion formed by the secondary transfer inner roller 8 and a secondary transfer outer roller 9 which are arranged so as to be opposed to each other. A predetermined pressure force and an electrostatic load bias are applied to the secondary transfer portion T2 so that the multi-color toner images are adsorbed from the intermediate transfer belt 7 onto the sheet S. In this manner, the secondary transfer portion T2 transfers the multi-color toner images formed on the intermediate transfer belt 7 onto the sheet S. Toner remaining on the intermediate transfer belt 7 after the transfer is collected by a transfer cleaner 11.

The sheet S having the multi-color toner images transferred thereon is conveyed by the secondary transfer outer roller 9 from the secondary transfer portion T2 to a fixing device 13. The fixing device 13 applies a predetermined pressure and a predetermined amount of heat to the sheet S in a fixing nip formed by opposing rollers, to thereby melt and fix the multi-color toner images onto the sheet S. The multi-color toner images develop their colors at the time of being melted and fixed so as to become a full-color toner image. The fixing device 13 includes a heater serving as a heat source, and is controlled to always maintain an optimum temperature.

The sheet S having the full-color toner image fixed thereto is discharged onto a discharge tray 63. In a case of duplex printing, a sheet S having an image formed on one surface thereof is reversed by a reverse conveyance mechanism 70 so as to be conveyed to the registration rollers 62, and thus image formation onto the other surface is performed. As described above, the image forming apparatus 100 performs image forming processing of forming an image onto a sheet based on image data.

<Controller>

Figure 2:
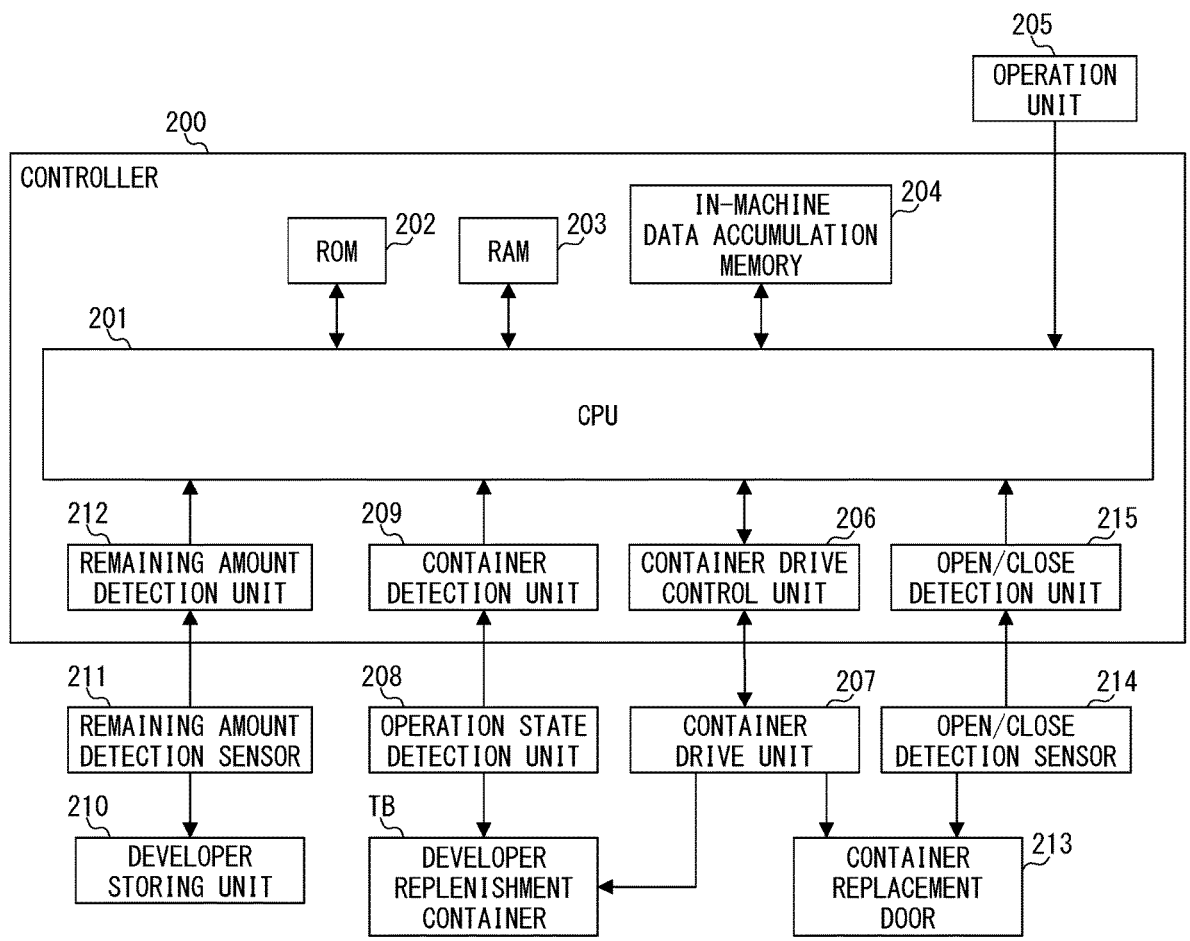
FIG. 2 is a configuration diagram of a controller.

FIG. 2 is a configuration diagram of a controller for controlling an overall operation of the image forming apparatus 100 configured as described above. A controller 200 of FIG. 2 shows a configuration for controlling replenishment of the developer, and configurations for other functions, for example, a function of controlling the image forming processing, are omitted.

The controller 200 is an information processing apparatus including a central processing unit (CPU) 201, a read only memory (ROM) 202, and a random access memory (RAM) 203. A container drive control unit 206, a container detection unit 209, a remaining amount detection unit 212, an open/close detection unit 215, an in-machine data accumulation memory 204, and an operation unit 205 are connected to the CPU 201.

The CPU 201 executes a computer program stored in the ROM 202 so as to perform various types of processing by the image forming apparatus 100. In this manner, the CPU 201 controls each device of the image forming apparatus 100. For example, the CPU 201 forms a full-color image which is based on image data onto the sheet S. The RAM 203 provides a work area used when the CPU 201 performs the processing, and stores temporary data or the like. The in-machine data accumulation memory 204 is a storage device for storing (accumulating) in-machine data such as the date and time at the time of occurrence of an error or maintenance, a counter value, and an error code. The counter value is a value (parameter) indicating an operation state of the image forming apparatus 100. The counter value is, for example, a cumulative number of printed sheets obtained by the image forming apparatus 100 or a cumulative number of times of replenishment of the developer replenishment container TB.

The operation unit 205 is a user interface including an input interface and an output interface. The input interface is various key buttons, a touch panel, and the like. The output interface is a display, a speaker, and the like. A user inputs various instructions or data through the input interface of the operation unit 205. The user can check the notification or the state of the image forming apparatus 100 through the output interface of the operation unit 205.

The container drive control unit 206 controls a container drive unit 207 in response to an instruction from the CPU 201. The container drive unit 207 includes a drive source for driving the developer replenishment container TB and opening a container replacement door 213. The container drive unit 207 performs switching between forward rotation and reverse rotation of one drive source so as to exclusively transmit a drive force to two different loads, in this case, the developer replenishment container TB and the container replacement door 213. The container drive unit 207 is supplied with a current by the container drive control unit 206 so as to be driven, to thereby drive the developer replenishment container TB. The container drive unit 207 is supplied with a current in a direction reverse to that at the time of driving the developer replenishment container TB by the container drive control unit 206 so as to be driven in a rotation direction reverse to that at the time of driving the developer replenishment container TB, to thereby open the container replacement door 213. The container replacement door 213 is a door to be opened at the time of replacement of the developer replenishment container TB, and is provided, for example, on the front side of the image forming apparatus 100.

The container detection unit 209 controls an operation state detection unit 208 in response to an instruction from the CPU 201. The operation state detection unit 208 is an operation monitoring unit including a sensor for detecting the drive of the developer replenishment container TB. The sensor included in the operation state detection unit 208 is, for example, an optical-type photosensor. The operation state detection unit 208 detects a drive state of the developer replenishment container TB so as to transfer a detection signal representing this drive state to the container detection unit 209. The container detection unit 209 transmits a detection result obtained by the operation state detection unit 208 to the CPU 201.

While the CPU 201 transmits the drive signal to the container drive control unit 206 so as to drive the container drive unit 207, the CPU 201 acquires the detection result obtained by the operation state detection unit 208. When, even though the drive signal is transmitted to the container drive control unit 206, the detection result obtained by the operation state detection unit 208 indicates that the developer replenishment container TB is not driven, the CPU 201 determines that a failure has occurred, and thus performs error display onto the operation unit 205. At the same time, the CPU 201 accumulates, as the in-machine data, the error code assigned in advance in accordance with the type of the error, the date and time at which the error has occurred, and the counter value indicating the operation state of the image forming apparatus 100 into the in-machine data accumulation memory 204.

The remaining amount detection unit 212 controls a remaining amount detection sensor 211 in response to an instruction from the CPU 201. The remaining amount detection sensor 211 is a sensor for detecting an amount of developer in a developer storing unit 210. The remaining amount detection sensor 211 is a sensor such as a piezo-electric element-type powder level sensor including piezo-electric ceramics and a vibrating structure.

The remaining amount detection sensor 211 transmits a detection signal indicating a detection result of the developer amount in the developer storing unit 210 to the remaining amount detection unit 212. The remaining amount detection unit 212 transmits the detection result obtained by the remaining amount detection sensor 211 to the CPU 201. The CPU 201 acquires the detection result obtained by the remaining amount detection sensor 211 during the image forming operation. When the detection result obtained by the remaining amount detection sensor 211 indicates that the developer amount in the developer storing unit 210 is small, the CPU 201 transmits a drive signal to the container drive control unit 206, to thereby drive the container drive unit 207 to supply the developer to the developer storing unit 210.

When the developer replenishment container TB gets empty, the user or the CE performs an operation of replacing the developer replenishment container TB. At this time, the CPU 201 displays a replacement button onto the operation unit 205. When the CPU 201 detects that this replacement button is pressed, the CPU 201 transmits a drive signal to the container drive control unit 206 so that the container drive unit 207 rotates in a direction reverse to that at the time of driving the developer replenishment container TB. In this manner, the container drive unit 207 opens the container replacement door 213.

The container replacement door 213 is a door for preventing access to the developer replenishment container TB from the outside so that the replacement work is performed only when the developer replenishment container TB gets empty. An open/close state of the container replacement door 213 is detected by an open/close detection sensor 214. The open/close detection sensor 214 is a state monitoring unit formed of, for example, an optical-type photosensor. The open/close detection sensor 214 transmits a detection signal indicating a detection result of the open/close state of the container replacement door 213 to the open/close detection unit 215. The open/close detection unit 215 transmits the detection result obtained by the open/close detection sensor 214 to the CPU 201.

After the CPU 201 transmits the drive signal to the container drive control unit 206 so as to open the container replacement door 213, the CPU 201 acquires the detection result obtained by the open/close detection sensor 214. When the detection result obtained by the open/close detection sensor 214 indicates that the container replacement door 213 is brought to the open state, the CPU 201 stops the drive signal transmitted to the container drive control unit 206.

When the detection result obtained by the open/close detection sensor 214 indicates that the container replacement door 213 is not brought to the open state even though the drive signal is transmitted to the container drive control unit 206 for a predetermined time period, the CPU 201 determines that a failure has occurred, and thus performs error display onto the operation unit 205. At the same time, the CPU 201 accumulates, as the in-machine data, the error code assigned in advance in accordance with the type of the error, the date and time at which the error has occurred, and the counter value indicating the operation state of the image forming apparatus 100 into the in-machine data accumulation memory 204.

<Developer Replenishment Operation>

Figure 3:
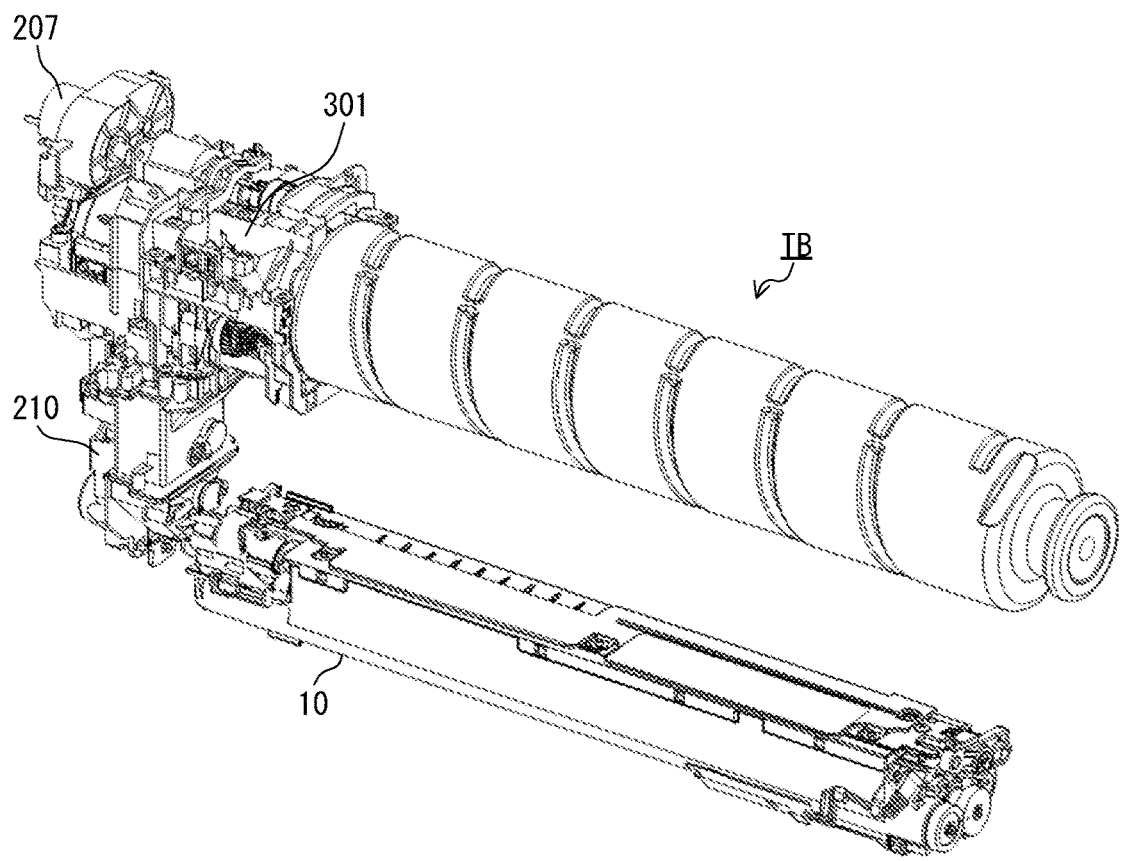
FIG. 3 is an overall configuration view of a developer replenishment system.
Figure 4:
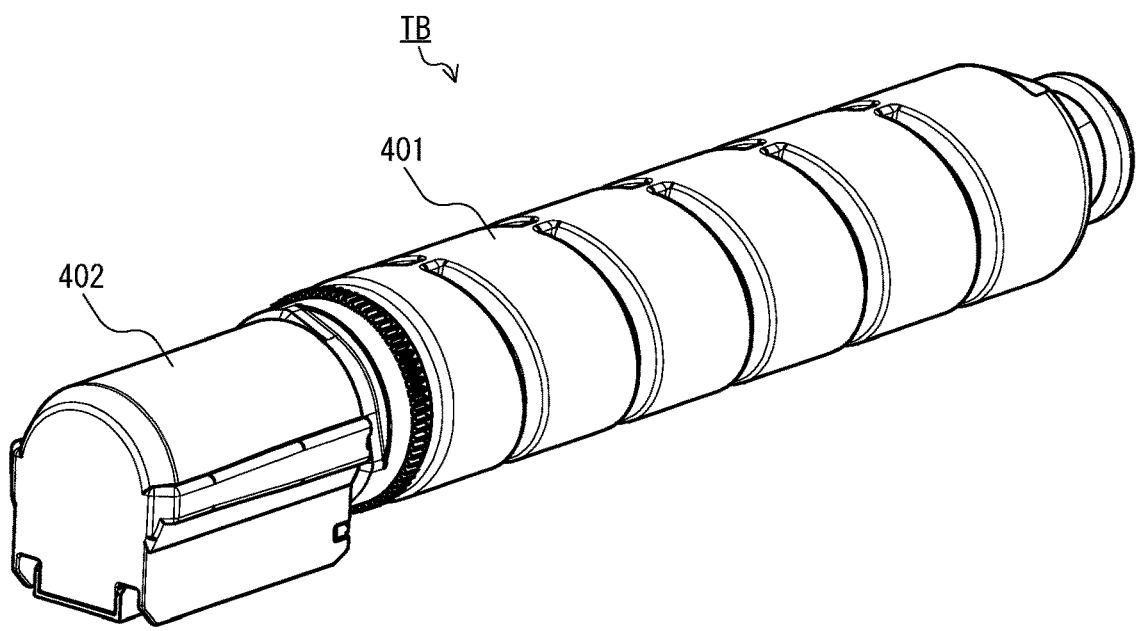
FIG. 4 is an external appearance view of a developer replenishment container.
Figure 5:
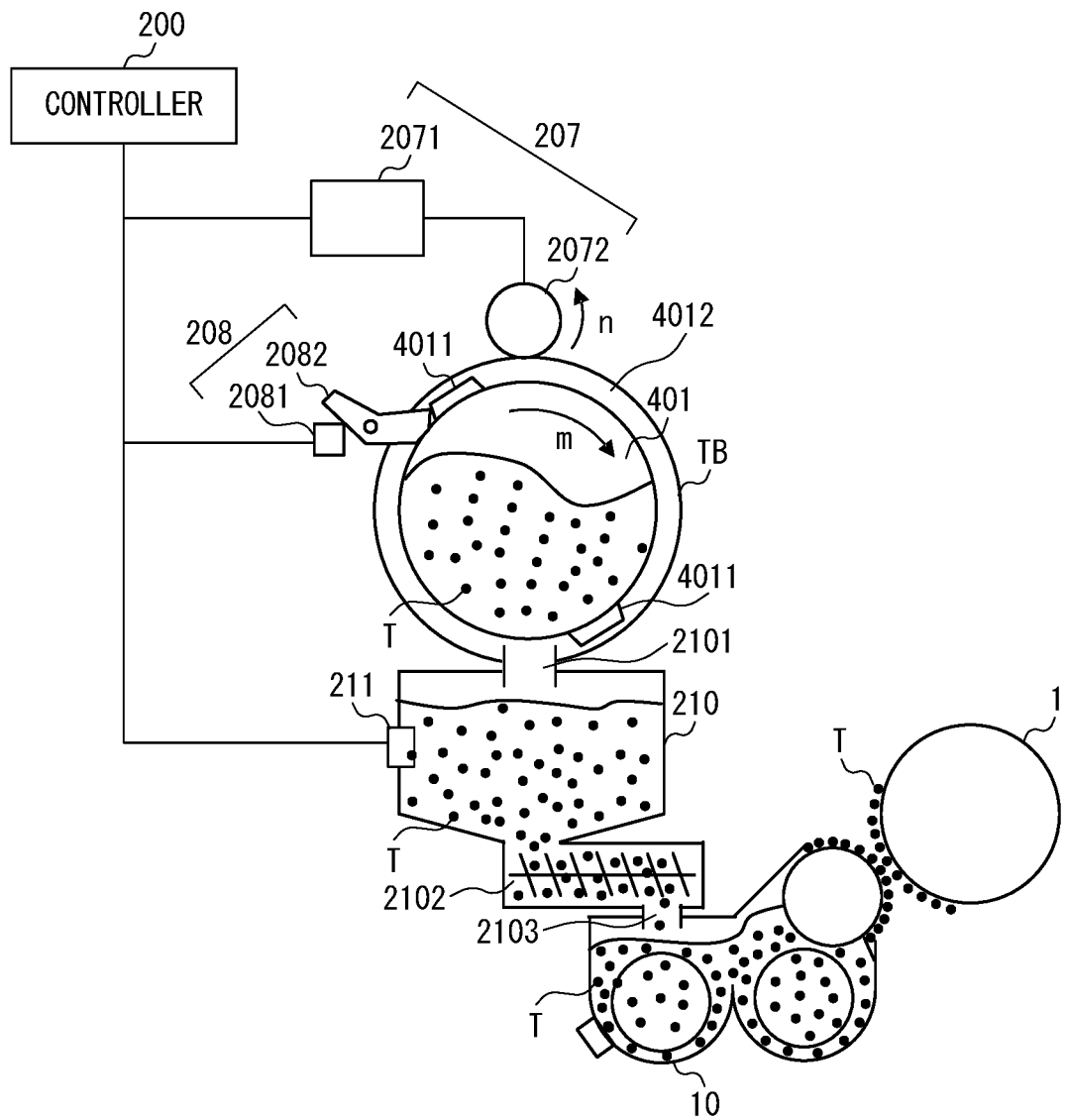
FIG. 5 is a cross-sectional view of the developer replenishment system.
Figure 6:
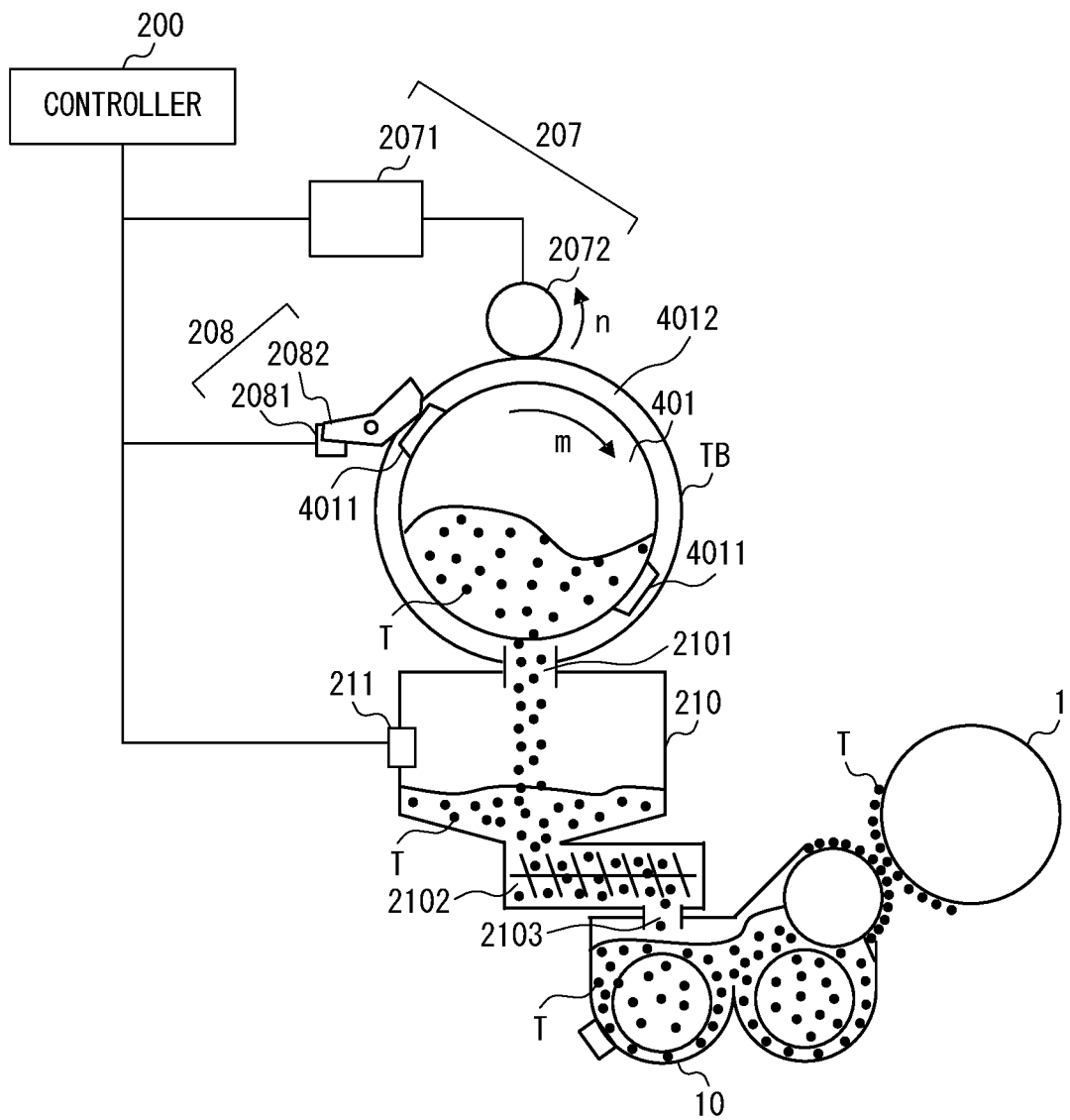
FIG. 6 is a cross-sectional view of the developer replenishment system.

The developer replenishment system and the replenishment operation are described with reference to FIG. 3 to FIG. 6. FIG. 3 is an overall configuration view of the developer replenishment system. FIG. 4 is an external appearance view of the developer replenishment container TB. FIG. 5 and FIG. 6 are cross-sectional views of the developer replenishment system.

As illustrated in FIG. 3, the developer replenishment system mainly includes the container drive unit 207, a container holding unit 301, and the developer storing unit 210. The container holding unit 301 holds the developer replenishment container TB inside the image forming apparatus 100. The container drive unit 207 drives the developer replenishment container TB. The developer storing unit 210 stores a certain amount of developer T, and supplies the developer to the developing device 10.

The developer replenishment container TB is freely mountable to and removable from the image forming apparatus 100. As illustrated in FIG. 4, the developer replenishment container TB includes a held unit 402 and a developer accommodation unit 401. The held unit 402 is to be held by the container holding unit 301 under a state of being mounted to the image forming apparatus 100. The developer accommodation unit 401 is rotatable relative to the held unit 402.

As illustrated in FIG. 5, the container drive unit 207 includes a drive motor 2071 and a drive transmission portion 2072. The drive motor 2071 is driven by a drive signal output from the CPU 201. The drive transmission portion 2072 transmits a drive force of the drive motor 2071 to the developer replenishment container TB. The developer accommodation unit 401 accommodates therein the developer T for replenishment. The developer accommodation unit 401 has a drive receiving portion 4012 and a protruding portion 4011 provided thereto. The drive receiving portion 4012 is provided at a part of an outer peripheral portion of the developer accommodation unit 401 so as to receive the drive force from the container drive unit 207. The protruding portion 4011 is brought into abutment against a detection flag 2082 to be described later.

The developer storing unit 210 is provided so as to store a certain amount of developer T in order to stably supply the developer T to the developing device 10. The developer storing unit 210 includes a receiving portion 2101, the remaining amount detection sensor 211, a conveyance portion 2102, and an ejection port 2103. The receiving portion 2101 is provided at an upper portion of the developer storing unit 210 so as to receive the developer T ejected from the developer replenishment container TB. The remaining amount detection sensor 211 is provided at a substantially center portion of the developer storing unit 210 so as to detect the remaining amount of developer T therein. The conveyance portion 2102 and the ejection port 2103 are provided at portions below the remaining amount detection sensor 211 so as to convey the developer T to the developing device 10.

The container holding unit 301 (see FIG. 3) is provided at a portion above the developer storing unit 210. The container holding unit 301 includes the above-mentioned operation state detection unit 208 for monitoring the operation state of the developer replenishment container TB. The operation state detection unit 208 includes a photosensor 2081 and the detection flag 2082. The detection flag 2082 blocks or releases a detection surface of the photosensor 2081 in association with the rotation operation of the developer replenishment container TB.

When the user gives an instruction to perform an image forming operation, the image forming processing is executed. As a result, as illustrated in FIG. 5, the developer T in the developing device 10 adheres to the photosensitive member 1 so as to be consumed. When the CPU 201 determines that a certain amount of developer T in the developing device 10 has been consumed, the developer T is supplied from the developer storing unit 210 to the developing device 10.

When the developer is supplied to the developing device 10, as illustrated in FIG. 6, the amount of developer T in the developer storing unit 210 is reduced, and a detection level obtained by the remaining amount detection sensor 211 is reduced. The CPU 201 which has detected that the amount of developer T in the developer storing unit 210 has been reduced to be smaller than a predetermined amount from the detection result obtained by the remaining amount detection sensor 211 drives the container drive unit 207 so as to supply the developer T from the developer replenishment container TB to the developer storing unit 210. When the developer replenishment container TB is rotated in a direction of an arrow "m," the developer T is supplied to the developer storing unit 210.

Figure 7A:
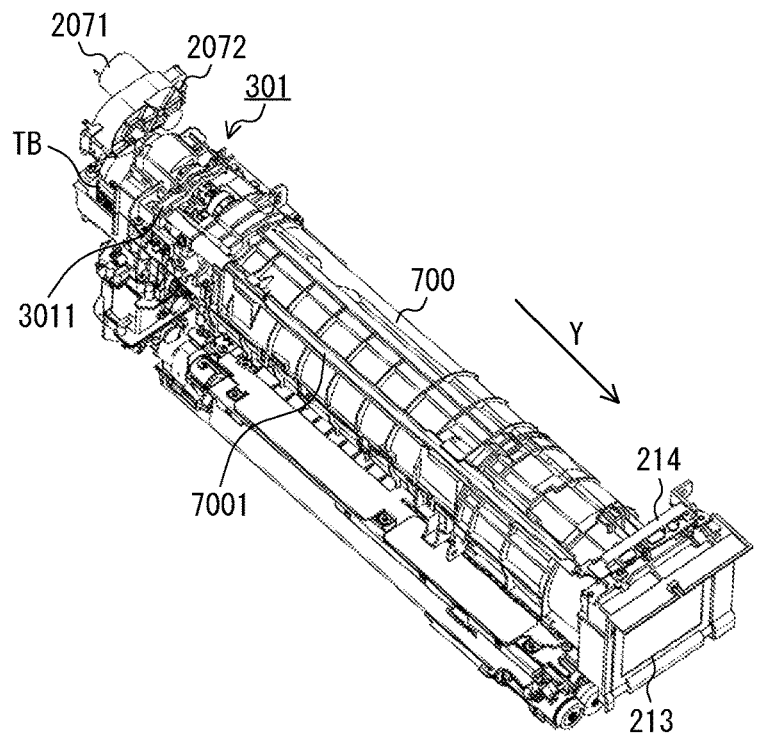
FIG. 7A, FIG. 7B, and FIG. 7C are views for illustrating a state in which the developer replenishment container is unremovable.
Figure 7B:
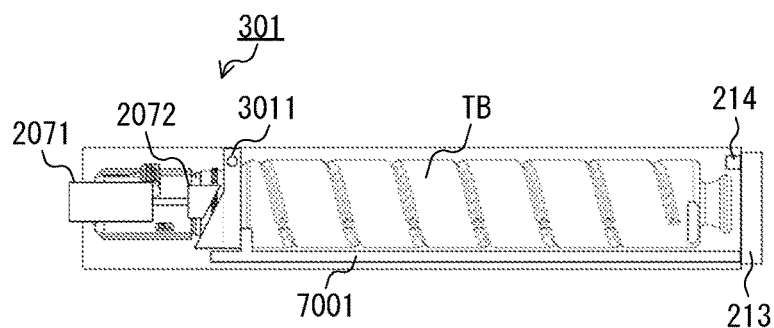
Figure 7C:
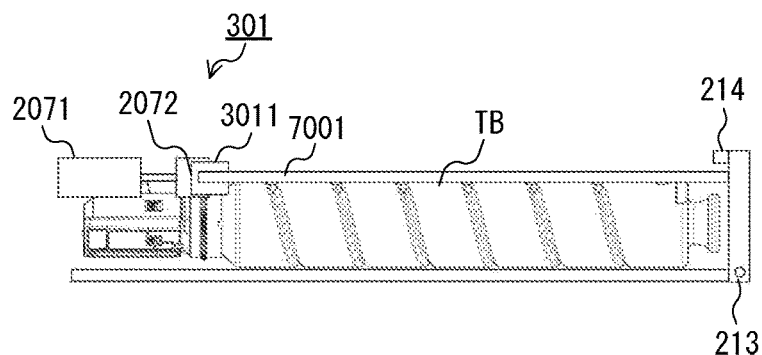
Figure 8A:
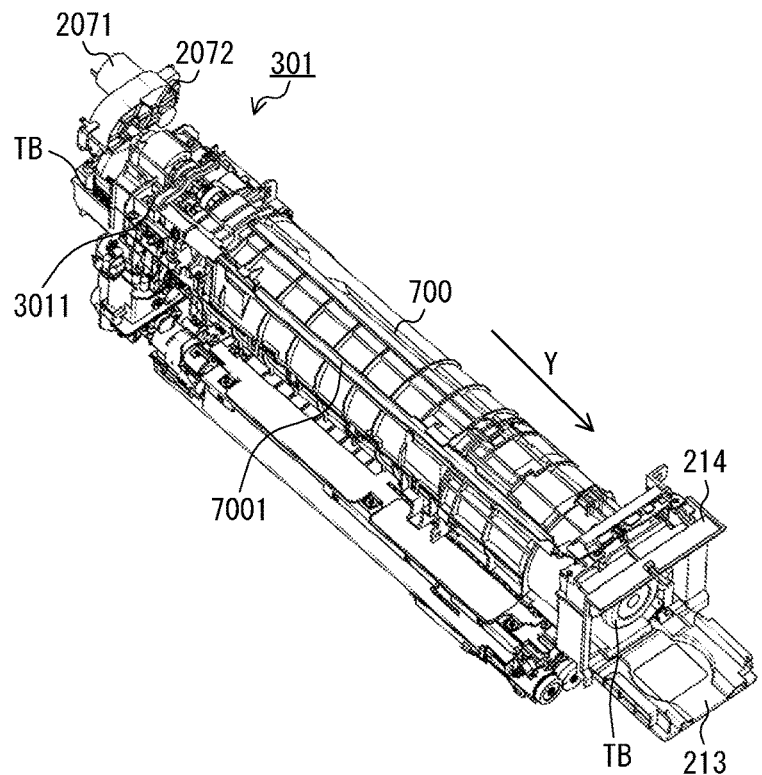
FIG. 8A, FIG. 8B, and FIG. 8C are views for illustrating a state in which the developer replenishment container is removable.
Figure 8B:
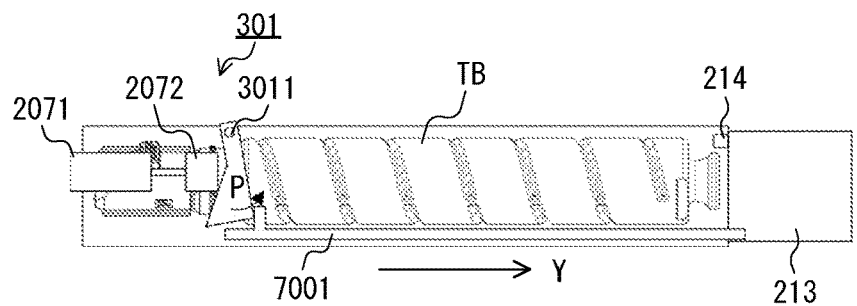
Figure 8C:
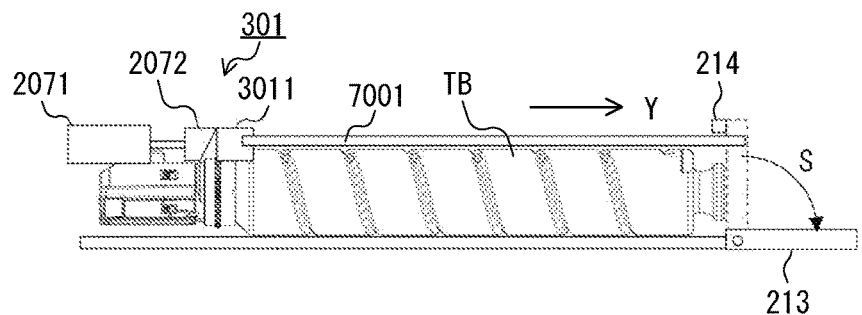

The operation of replacing the developer replenishment container TB is described with reference to FIG. 7A to FIG. 7C and FIG. 8A to FIG. 8C. FIG. 7A to FIG. 7C are views for illustrating a state in which the developer replenishment container TB is mounted to the image forming apparatus 100 in an unremovable manner. FIG. 8A to FIG. 8C are views for illustrating a state in which the developer replenishment container TB is removable from the image forming apparatus 100. FIG. 7A and FIG. 8A are perspective views. FIG. 7B and FIG. 8B are top views. FIG. 7C and FIG. 8C are side views. For the sake of convenience in description, FIG. 7B, FIG. 7C, FIG. 8B, and FIG. 8C show simplified configurations.

As illustrated in FIG. 7A, under a state in which the image forming apparatus 100 is in operation, the developer replenishment container TB is incorporated in a container housing 700. Access to the developer replenishment container TB from the outside is disabled by the container replacement door 213 provided to the container housing 700.

As illustrated in FIG. 7B, the container replacement door 213 is coupled to the drive transmission portion 2072 of the container drive unit 207 via a link shaft 7001 and a link member 3011. The link shaft 7001 extends along the container housing 700. The link member 3011 is provided in the container holding unit 301. Further, the container housing 700 has the open/close detection sensor 214 provided so as to detect the opening or closing of the container replacement door 213.

When the developer replenishment container TB gets empty, the operation of replacing the developer replenishment container TB is performed by the user or the CE. At this time, in response to pressing of the replacement button of the developer replenishment container TB displayed on the operation unit 205, the drive motor 2071 and the drive transmission portion 2072 of the container drive unit 207 rotate in a direction reverse to that at the time of the operation of replenishing the developer T of the developer replenishment container TB (rotation in a direction opposite to that of an arrow "n" of FIG. 6). A clutch (not shown) is provided in a part of the drive transmission portion 2072 so that the clutch prevents the drive force from being transmitted to the developer replenishment container TB at the time of the reverse rotation.

As illustrated in FIG. 8B, the reverse rotation of the drive transmission portion 2072 causes a part of the drive transmission portion 2072 to be brought into abutment against the link member 3011, and thus the link member 3011 turns in a direction of an arrow P. Next, along with the operation of the link member 3011, the link shaft 7001 is displaced in a direction of an arrow Y. Along with the displacement of the link shaft 7001, the container replacement door 213 is opened in a direction of an arrow S of FIG. 8C. As illustrated in FIG. 8A, when the container replacement door 213 is opened, the user or the CE can remove the developer replenishment container TB in the Y direction so as to replace this developer replenishment container TB with a new developer replenishment container.

In the operation of replacing the developer replenishment container TB, the open/close detection sensor 214 monitors a state concerning whether the container replacement door 213 is correctly opened. When an abnormality of the open/close detection sensor 214 is detected, the CPU 201 determines that an abnormality has occurred in the operation of replacing the developer replenishment container TB due to some kind of failure, and thus stops the image forming apparatus 100. The abnormality of the open/close detection sensor 214 is detected when, for example, the detection state of the open/close detection sensor 214 has not changed within a certain time period regardless of the pressing of the replacement button. After that, the CPU 201 displays the fact that the abnormal state has occurred and thus the image forming apparatus 100 has been stopped on the operation unit 205 so as to notify the user of this fact. Further, when the image forming apparatus 100 is connected to a network, the CPU 201 notifies the CE or the sales company of the fact that an abnormal state has occurred and thus the image forming apparatus 100 has been stopped via the network.

The abnormality of the operation of replacing the developer replenishment container TB is mainly caused by the following three failure states.

The first failure state is a failure of the container drive unit 207. Such a failure is hereinafter referred to as "failure mode A." Specifically, for example, the failure mode A occurs when the drive motor 2071 does not operate or when the drive transmission portion 2072 becomes a load to prevent the drive force from being transmitted. In this case, no drive force is transmitted to the link member 3011 and the link shaft 7001, and hence the container replacement door 213 is not opened.

The second failure state is a failure of the link member 3011 itself or the link shaft 7001 itself which has received the drive force from the container drive unit 207. Such a failure is hereinafter referred to as "failure mode B." Specifically, the failure mode B occurs when the link member 3011 and the link shaft 7001 are brought to a non-coupling state due to bad assembly, an impact in a distribution system, or the like. In this case, similarly to the failure mode A, no drive force is transmitted to the link shaft 7001, and hence the container replacement door 213 is not opened.

The third failure state is a failure of the open/close detection sensor 214. Such a failure is hereinafter referred to as "failure mode C." In the case of the failure mode C, the container replacement door 213 is opened by the drive force of the container drive unit 207, but this open state is not detected.

The recovery work of the stopped image forming apparatus 100 is desired to be performed promptly by the CE. For example, in the case of the failure mode A, the container drive unit 207 is required to be repaired, and in the case of the failure mode B, the link shaft 7001 or the link member 3011 of the container holding unit 301 is required to be repaired. In the case of the failure mode C, the open/close detection sensor 214 is required to be repaired. However, in actuality, it takes some time of from several hours to several days before the maintenance work is performed in response to reception of the notification, in consideration of identification of a repair part and arrangement of a repair component.

Thus, in some cases, the user is given an instruction to perform an operation of repowering the image forming apparatus 100 so as to restart the image forming apparatus 100 and also checking whether the image forming apparatus 100 can reoperate and what kind of state the image forming apparatus 100 is brought into after the reoperation. This instruction is given so as to restart the image forming apparatus 100 to acquire information for identifying the causal part serving as a repair target. Further, depending on the level or the type of the failure, in some cases, through restart, the image forming apparatus 100 does not immediately stop and can continuously perform the image formation. In this case, there is a possibility that the opportunity loss of the user can be suppressed to the minimum.

For example, in a case in which the abnormality of the replacement operation is the failure mode A or the failure mode B, when the image forming apparatus 100 reoperates, a notification of urging the user to replace the developer replenishment container TB is output again. At this time, when the operation unit 205 is operated as in the same way as the previous time, the state has no change, and hence it is highly possible that a similar operation abnormality immediately occurs. When the operation abnormality has occurred, the user or the CE is notified of this fact again. In other words, with the immediate reoccurrence of the operation abnormality, the CE can assume that the operation abnormality of this time is an abnormality of the drive transmission portion 2072, which is a cause of the failure mode A, or an abnormality of the link member 3011 or the link shaft 7001, which is a cause of the failure mode B.

If the failure mode C has occurred, the image forming apparatus 100 has been stopped, but the container replacement door 213 is opened. Thus, there is a possibility that the developer replenishment container TB has been replaced. In this case, when the image forming apparatus 100 is reoperated, the CPU 201 detects that the developer replenishment container TB has been replaced, and hence the notification of urging the user to replace the developer replenishment container TB is not given. That is, it is highly possible that the image forming apparatus 100 operates as usual, and a similar operation abnormality occurs again when the replaced developer replenishment container TB gets empty. The CE can determine that, because the operation abnormality does not immediately occur again, it is highly possible that the cause of the operation abnormality of the previous time is a failure of the open/close detection sensor 214, which is a cause of the failure mode C.

<Error Code>

FIG. 9 is an explanatory table of error codes. FIG. 9 shows an error code to be displayed on the operation unit 205 when the CPU 201 detects an error of the container replacement door 213, detection contents thereof, an occurring phenomenon, a failure mode, a causal part, and an operation period until reoccurrence of the error at the time of reoperation. With reference to FIG. 9, a relationship between each error and failure contents and a period until reoccurrence of the error at the time of reoperation are described.

An error of an error code E001 is an error to be issued when, even though the container drive unit 207 is driven to rotate in the reverse direction, the open state of the container replacement door 213 cannot be detected by the open/close detection sensor 214. As described above, in this case, any of the failure mode A, the failure mode B, and the failure mode C has occurred. When the failure mode A or the failure mode B has occurred, the container drive unit 207, or at least one of the link member 3011 and the link shaft 7001, has a failure. When the failure mode C has occurred, the open/close detection sensor 214 has a failure. In any of the failures, the CPU 201 cannot detect the open state of the container replacement door 213, and hence the CPU 201 issues the same error code E001.

In the failure mode A or the failure mode B, the container replacement door 213 is not opened, and hence the developer replenishment container TB is not replaced and remains empty. Accordingly, when the image forming apparatus 100 is restarted and reoperated after the occurrence of the error, the CPU 201 drives the container drive unit 207 again so as to open the container replacement door 213. However, the open state of the container replacement door 213 cannot be detected, and hence the error of the error code E001 occurs again. The error of the error code E001 occurs again within a short operation period, specifically, at the number of printed sheets of 10 sheets or less. A threshold value of the number of printed sheets of 10 sheets is a value until reoccurrence of the error of the error code E001, which is calculated based on an operation period of the image forming apparatus 100 until the error determination is made.

In the failure mode C, the open/close detection sensor 214 cannot detect the open state, but the container replacement door 213 is opened, and hence the work of replacing the developer replenishment container TB can be performed. When the developer replenishment container TB is replaced, the container replacement door 213 is not opened again until the timing at which the replaced developer replenishment container TB gets empty. Accordingly, the error of the error code E001 occurs again after an operation period longer than those of the failure modes A and B, specifically, at the number of printed sheets of more than 10 sheets.

<Error-Related Information>

FIG. 10 is a table of error-related information accumulated in the in-machine data accumulation memory 204. The error-related information includes the date and time at which the error has occurred, the counter value indicating the operation state of the image forming apparatus 100, and the error code assigned in advance in accordance with the type of the error. Here, the counter value is the cumulative number of printed sheets of the image forming apparatus 100.

Every time the CPU 201 detects an error, the CPU 201 accumulates the error-related information exemplified in FIG. 10 into the in-machine data accumulation memory 204 in a form of adding one row. For example, the error-related information in the first row of FIG. 10 indicates that, at 2022/6/1 12:00, the error of the error code E001 has occurred in the operation state of the cumulative number of printed sheets of 100,010 sheets. In causal part deduction, the CPU 201 refers to this error-related information so as to deduce the causal part from the cumulative number of printed sheets and the error code.

<Causal Part Deduction>

In the causal part deduction, the failure patterns are classified into a plurality of patterns (in this case, three patterns), and determination on which failure pattern the occurrence state of the error is applied to is made. The causal part is deduced in accordance with the determined failure pattern. FIG. 11A to FIG. 11D are explanatory diagrams of the failure patterns. The horizontal axis of each of FIG. 11A to FIG. 11D indicates the counter value of the image forming apparatus 100. The triangular mark indicates the timing at which an error has occurred. The white triangular mark indicates an error to be analyzed in the causal part deduction. The hatched triangular mark indicates an error which has occurred in the past before an occurrence of the error to be analyzed.

In the causal part deduction, one predetermined error is paid attention as an error to be analyzed. The causal part deduction is performed through use of the error code and the counter value of the error to be analyzed and the error code and the counter value of a related error related to the error to be analyzed. The related error refers to an error that may occur by a causal part similar to a causal part at which the error to be analyzed may occur, and is also an error which has occurred in the past before an occurrence of the error to be analyzed.

The causal part deduction is performed based on a difference between the counter value at the time of occurrence of the related error in the past and the counter value at the time of reoccurrence of the error to be analyzed after the image forming apparatus 100 is restarted and reoperated. This difference in the counter value is referred to as "operation period." It is determined whether or not the operation period falls within a predetermined range, and the causal part is deduced based on a determination result.

Figure 11A:
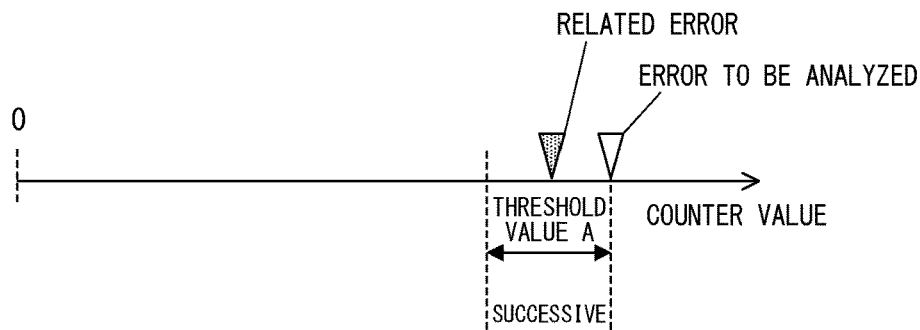
FIG. 11A, FIG. 11B, FIG. 11C, and FIG. 11D are explanatory diagrams of failure patterns.

FIG. 11A shows such a failure state that the operation period between the error to be analyzed and the related error is short and an error occurs immediately after the reoperation. Errors successively occur, and thus such a failure pattern is defined as "successive." The CPU 201 determines whether a related error occurs within a range of a threshold value A of the operation period. When a related error occurs within the range of the threshold value A, the CPU 201 determines that the failure pattern is "successive." The threshold value A is a value which is set in advance in order to determine that the failure pattern is "successive," and is stored in the ROM 202. The threshold value A may be determined by calculating a value that has a high statistical probability, based on data obtained by associating a large number of pieces of error occurrence information and causal parts with each other.

Figure 11B:
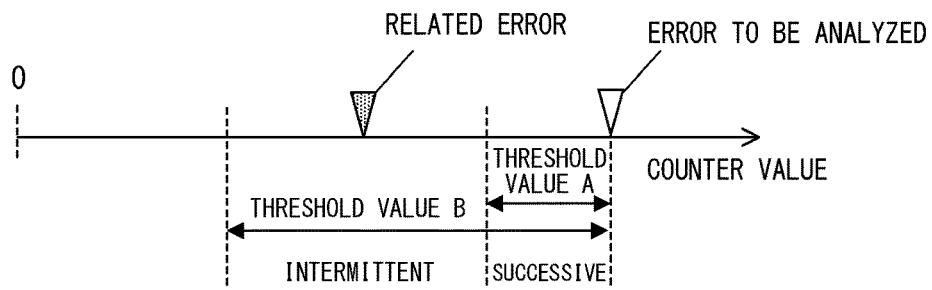

FIG. 11B shows a failure state in which the operation period between the error to be analyzed and the related error is longer than that of the failure pattern of "successive." Errors occur at an interval, and hence such a failure pattern is defined as "intermittent." The CPU 201 determines whether the related error has occurred within a range of more than the threshold value A and equal to or less than the threshold value B. When the related error is present within the range of more than the threshold value A and equal to or less than the threshold value B, the CPU 201 determines that the failure pattern is "intermittent." The threshold value B is a value which is set in advance in order to determine that the failure pattern is "intermittent," and is stored in the ROM 202. The threshold value B is a period longer than the threshold value A. The threshold value B may be determined by calculating a value that has a high statistical probability, based on data obtained by associating a large number of pieces of error occurrence information and causal parts with each other.

Figure 11C:
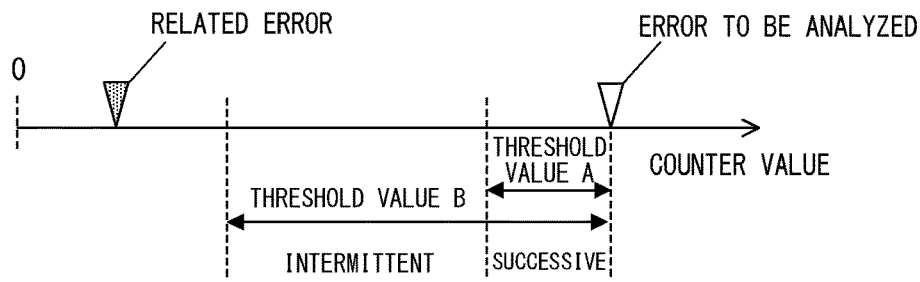

FIG. 11C shows a state in which the operation period between the error to be analyzed and the related error is further longer than that of the failure pattern of "intermittent." In such a case, it is determined that there is a low possibility that the predetermined failure state is continued for a long time because a period with stable operation is long. Thus, it is determined that the error to be analyzed and the related error have been caused not by the same failure cause, but by failure causes independent of each other.

That is, the CPU 201 determines that no related error caused by the same failure cause as that of the error to be analyzed has occurred. Such a failure pattern is defined as "no occurrence" because no related error has occurred. In this case, there is no information for performing the causal part deduction, and hence the causal part deduction cannot be performed based on the counter value. The CPU 201 determines that the related error is absent within the range of the threshold value A and the related error is absent within the range of more than the threshold value A and equal to or less than the threshold value B, to thereby determine that the failure pattern is "no occurrence."

Figure 11D:
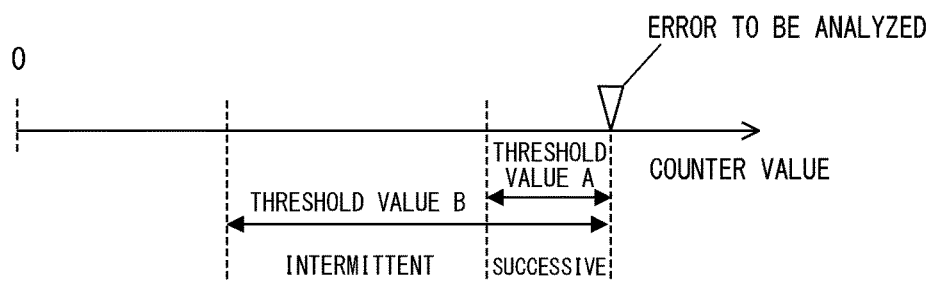

FIG. 11D shows a state in which no related error occurs. In such a case, there is no information for performing the causal part deduction, and hence no causal part deduction can be performed based on the counter value. Such a failure pattern is defined as "no occurrence" as in FIG. 11C. The processing of the CPU 201 is similar to that in FIG. 11C. The CPU 201 determines that the related error is absent within the range of the threshold value A and the related error is absent within the range of more than the threshold value A and equal to or less than the threshold value B, to thereby determine that the failure pattern is "no occurrence."

FIG. 12 is a diagram of a causal part deduction table. The causal part deduction table of FIG. 12 is causal part deduction information obtained by organizing, for each combination of the error code of the error to be analyzed and the error code of the related error, information indicating a relationship among a determination condition based on the threshold value A and the threshold value B, a failure pattern, and a causal part that has a possibility of becoming an error cause. The CPU 201 performs the causal part deduction based on the causal part deduction table. The causal part deduction table is stored in the ROM 202, and is read out at the time of execution of the causal part deduction. Details of the causal part deduction table are described.

"No. 1" corresponds to a case in which the error-to-be-analyzed code is "E001" and the related-error code is "E001," and further the failure pattern is "successive." This case corresponds to the failure mode A or the failure mode B of FIG. 9. The threshold value A for determining whether the failure pattern is "successive" or "intermittent" is 10 sheets. The CPU 201 determines that the failure state corresponds to "No. 1" when an error of the related-error code E001 has occurred within a range of 10 sheets or less, through use of a time of occurrence of an error of the error-to-be-analyzed code E001 as a reference. In this case, the CPU 201 deduces that the causal part is the container drive unit 207, or at least one of the link member 3011 and the link shaft 7001.

"No. 2" corresponds to a case in which the error-to-be-analyzed code is "E001" and the related-error code is "E001," and further the failure pattern is "intermittent." This case corresponds to the failure mode C of FIG. 9. The threshold value B for determining whether the failure pattern is "intermittent" or "no occurrence" is 1,000 sheets. The CPU 201 determines that the failure state corresponds to "No. 2" when an error of the related-error code E001 has occurred within a range of more than 10 sheets and equal to less than 1,000 sheets, through use of a time of occurrence of an error of the error-to-be-analyzed code E001 as a reference. In this case, the CPU 201 deduces that the causal part is the open/close detection sensor 214.

"No. 3" corresponds to a case in which the error-to-be-analyzed code is "E001" and the related-error code is "E001," and further the failure pattern is "no occurrence." The CPU 201 determines that the failure state corresponds to "No. 3" when an error of the related-error code E001 has not occurred within a range of 1,000 sheets or less, through use of a time of occurrence of an error of the error-to-be-analyzed code E001 as a reference. In this case, there is no information for performing the causal part deduction, and hence the CPU 201 deduces that the causal part is any of all parts related to the error-to-be-analyzed code E001. Any of all parts related to the error-to-be-analyzed code E001 is the container drive unit 207, or the open/close detection sensor 214, or at least one of the link member 3011 and the link shaft 7001.

Figure 13:
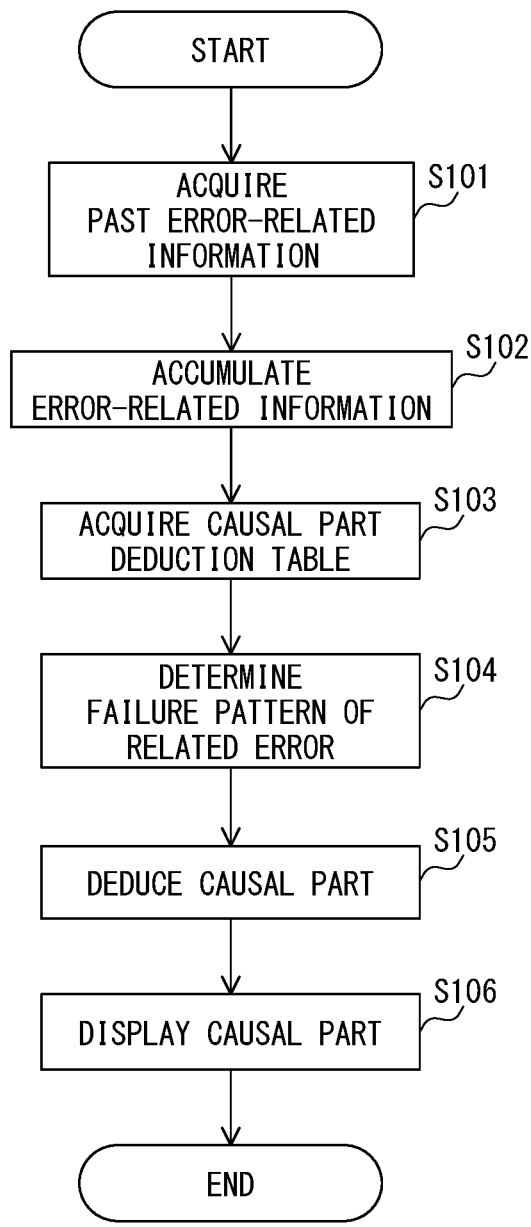
FIG. 13 is a flow chart for illustrating processing of accumulating the error-related information and processing of deducing a causal part.

FIG. 13 is a flow chart for illustrating processing of accumulating the error-related information and processing of deducing the causal part. This series of steps of processing are executed when an error has occurred in the image forming apparatus 100.

The CPU 201 acquires the error-related information on an error which has occurred in the past from the in-machine data accumulation memory 204 (Step S101). The CPU 201 accumulates the error-related information on an error which has newly occurred into the in-machine data accumulation memory 204 (Step S102). The CPU 201 acquires the causal part deduction table from the ROM 202 (Step S103).

The CPU 201 determines the failure pattern of the related error based on the past error-related information (Step S104). This determination is made for each related error. For example, when the error-to-be-analyzed code is "E001," the CPU 201 determines that, based on the causal part deduction table of FIG. 12, the related-error code corresponding to "E001" is "E001," and makes determination on the failure pattern. Details of the method of determining the failure pattern are described later.

The CPU 201 deduces the causal part from the error code and the failure pattern, based on the causal part deduction table (Step S105). For example, when the error-to-be-analyzed code is "E001," the related-error code is "E001," and the failure pattern is "successive," the CPU 201 deduces that the causal part is the container drive unit 207, or at least one of and the link member 3011 and the link shaft 7001. When a plurality of types of related errors have occurred and the failure state corresponds to a plurality of failure patterns, the CPU 201 combines the causal parts deduced for the respective failure patterns as a deduction result. For example, it is assumed that the error-to-be-analyzed code is "E001," and both of a determination result in which the related-error code is "E001" and the failure pattern is "successive" and a determination result in which the related-error code is "E001" and the failure pattern is "intermittent" are obtained. In this case, the CPU 201 deduces that the container drive unit 207, or the open/close detection sensor 214, or at least one of the link member 3011 and the link shaft 7001, which are the causal parts of the respective cases, is the causal part.

The CPU 201 displays, onto the operation unit 205, information on the causal part, based on the deduction result obtained by the causal part deduction processing (Step S106). After the display, the CPU 201 ends the series of steps of processing. Not only the causal part but also maintenance-related information may be additionally displayed on the operation unit 205. The maintenance-related information is, for example, a component replacement procedure or a rough work time period required for maintenance. For example, the maintenance-related information corresponding to the causal part is stored in advance in the ROM 202. The CPU 201 reads out the corresponding maintenance-related information from the ROM 202 after the causal part deduction, and displays the maintenance-related information onto the operation unit 205. Further, when the image forming apparatus 100 is connected to a network, the CPU 201 notifies the CE of the causal part and the maintenance-related information via the network.

FIG. 14 is a flow chart for illustrating the processing of determining the failure pattern of Step S104.

The CPU 201 calculates the difference in the counter value between the error to be analyzed and the related error, and determines whether the calculated difference falls within the threshold value A (Step S201). The threshold value A is, as described above, the number of printed sheets of 10 sheets. For example, when the cumulative number of printed sheets of the error to be analyzed is 100,000 sheets and the cumulative number of printed sheets of the related error is 99,999 sheets, the difference is one sheet. The CPU 201 determines whether this difference is a value equal to or less than 10 sheets corresponding to the threshold value A.

When the difference is equal to or less than the threshold value A (Step S201: Y), the CPU 201 determines that the failure pattern is "successive" (Step S202), and ends the processing of determining the failure pattern. When the difference is more than the threshold value A (Step S201: N), the CPU 201 determines whether the difference calculated in the process step of Step S201 is more than the threshold value A and equal to or less than the threshold value B (Step S203). The threshold value B is, as described above, the number of printed sheets of 1,000 sheets. When the difference is equal to or less than the threshold value B (Step S203: Y), the CPU 201 determines that the failure pattern is "intermittent" (Step S204), and ends the processing of determining the failure pattern. When the difference is more than the threshold value B (Step S203: N), the CPU 201 determines that the failure pattern is "no occurrence" (Step S205), and ends the processing of determining the failure pattern.

<Processing Performed after Maintenance>

Next, processing performed after maintenance of the causal part is described. When the causal part is deduced, the user or the CE identifies the causal part in accordance with the contents displayed in the process step of Step S106 of FIG. 13 so as to perform maintenance such as replacement of this identified part. After the maintenance, the image forming apparatus 100 performs a normal operation. FIG. 15A to FIG. 15F and FIG. 16A to FIG. 16C are explanatory diagrams of the processing performed after the maintenance.

FIG. 15A is an example of the error-related information accumulated in the in-machine data accumulation memory 204. FIG. 15B exemplifies the failure pattern obtained by the error-related information of FIG. 15A. For the sake of convenience, error history numbers (No.) are represented by "E1," "E2," and "E3." In this example, the error to be analyzed is an error of "E3." The past related errors are "E1" and "E2."

The difference in the counter value (cumulative number of printed sheets) between the error E3 to be analyzed and the past related error E1 and the difference in the counter value (cumulative number of printed sheets) between the error E3 to be analyzed and the past related error E2 are both more than the threshold value A (10 sheets) and less than the threshold value B (1,000 sheets). Accordingly, the error "E3" has the failure pattern of "intermittent." Thus, with reference to the causal part deduction table of FIG. 12, it is deduced that the causal part is the open/close detection sensor 214.

After that, the user or the CE performs the maintenance of the open/close detection sensor 214 which has been deduced as the causal part. After the maintenance is ended, the user or the CE presses a maintenance end button (not shown) provided on the operation unit 205. In response to pressing of the maintenance end button, the CPU 201 accumulates maintenance end information (M1) indicating that the maintenance has been performed into the in-machine data accumulation memory 204 (FIG. 15C and FIG. 15D). The maintenance end information on the maintenance M1 includes the date and time of occurrence of the maintenance, the cumulative number of printed sheets (counter value), and the error code. The error code is an error code of the error to be analyzed corresponding to the maintenance (here, the error E3 to be analyzed).

FIG. 15E and FIG. 15F show a case in which a new error E4 to be analyzed (error code E001) has occurred after the maintenance M1. The error E4 to be analyzed has the same error code as that of the error E3, and thus the same error has occurred again. If the causal part deduction is performed without performing any processing on the error-related information after the maintenance M1, the related errors E2 and E3 of the error E4 to be analyzed are regarded as being caused in "intermittent." Accordingly, with reference to the causal part deduction table of FIG. 12, it is deduced that the causal part is the open/close detection sensor 214 again even though the open/close detection sensor 214 has been subjected to maintenance.

In general, a causal part that has already been subjected to maintenance is less liable to have a failure again in a short time period, and hence it is highly possible that this determination is an erroneous determination. In order to reduce the possibility of such an erroneous determination, masking is performed so as to prevent the past related error which has occurred before the maintenance from being included in the deduction of the causal part. With the masking, the past related error which has occurred before the maintenance is removed from the causal part deduction of the new error E4 to be analyzed. In this case, the previous error E3 to be analyzed is also treated as the related error, and hence the information on the error E3 is also masked and removed from the causal part deduction.

FIG. 16A to FIG. 16C and FIG. 17A to FIG. 17F are explanatory diagrams of the masking of the error-related information.

FIG. 16A exemplifies a state in which the error-related information on the past related error which has occurred before the maintenance is masked. In FIG. 16A, when the error E4 to be analyzed of the error code E001 occurs again after the maintenance M1, the past related errors E1, E2, and E3 each having the same error code E001 as that of the maintenance M1 stored in the in-machine data accumulation memory 204 are masked. The masking prevents the information on the masked related errors E1, E2, and E3 from being acquired by the CPU 201. As described above, with the masking, the past error-related information is removed from the information to be used for the deduction of the causal part.

FIG. 16B is an explanatory diagram of the failure pattern at this time. The related errors E1, E2, and E3 which have occurred in the past before the maintenance M1 are not acquired, and hence the failure pattern of the error E4 to be analyzed is equivalent to that of "no occurrence." FIG. 16C is a flow chart for illustrating processing of masking the history of the related error which has occurred in the past before the maintenance M1, which has been accumulated in the in-machine data accumulation memory 204.

The CPU 201 starts this processing in response to the occurrence of the error E4 to be analyzed. When the error E4 to be analyzed occurs, the CPU 201 determines whether or not the in-machine data accumulation memory 204 includes information of maintenance end (Step S301). When no information of maintenance end is included (Step S301: N), the CPU 201 performs the failure pattern determination processing of FIG. 14 without masking the error-related information (Step S303). When the information of maintenance end is included (Step S301: Y), the CPU 201 masks the past error-related information obtained before the maintenance M1 (Step S302, FIG. 16A). The CPU 201 performs the failure pattern determination processing of FIG. 14 after the error-related information is masked (Step S303).

When the causal part deduction is performed through use of the masked error-related information, in the failure pattern determination processing, with reference to the causal part deduction table of FIG. 12, the failure pattern is "no occurrence." Accordingly, it is deduced that the causal part is the container drive unit 207, or the open/close detection sensor 214, or at least one of the link member 3011 and the link shaft 7001. The user and the CE know that the open/close detection sensor 214 has been subjected to maintenance by the maintenance M1, and hence the user and the CE can narrow down the causal part of this time to the container drive unit 207, or at least one of the link member 3011 and the link shaft 7001.

The masking of the error-related information may be performed not immediately in response to the pressing of the maintenance end button by the user or the CE, but after elapse of a predetermined grace period (hereinafter referred to as "reoccurrence section") in which whether the error is solved by the maintenance can be checked. Through masking of the error-related information obtained before the maintenance after the elapse of the reoccurrence section, it is checked whether or not the error has successfully been solved by the maintenance. Further, even when the error is not solved, the causal part can be further easily narrowed down from the plurality of candidates for the causal part.

FIG. 17A to FIG. 17F and FIG. 18 are explanatory diagrams of the masking of the error-related information in a case in which the reoccurrence section is set.

Figures 17A, 17B:
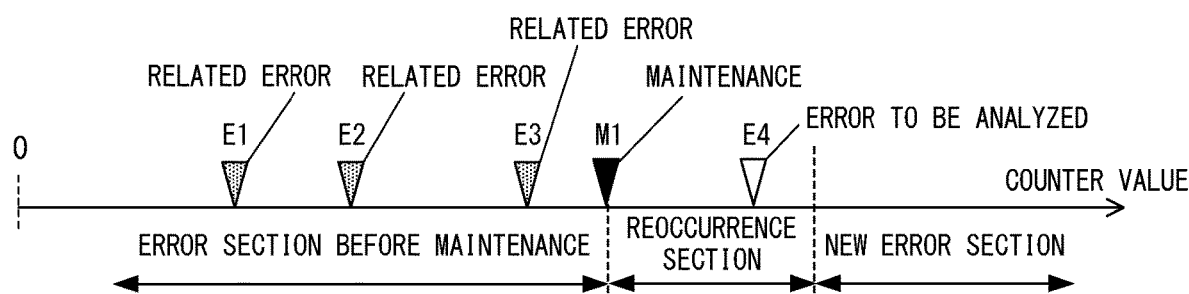

FIG. 17A exemplifies an error section before maintenance, the reoccurrence section, and a new error section. The error section before maintenance is a period in which the related error which has occurred before the maintenance M1 occurs. The reoccurrence section is a certain period after the maintenance M1. In this case, it is assumed that the reoccurrence section corresponds to a difference in the cumulative number of printed sheets after the maintenance of 10 sheets. The new error section is a period in which the related error occurs after the reoccurrence section. In the error section before maintenance, the related errors E1, E2, and E3 shown in FIG. 17B have occurred.

A case in which the related error E3 (cumulative number of printed sheets of 101,055 sheets) is the error to be analyzed is described. In this case, the difference in the cumulative number of printed sheets with respect to the past related error E2 (cumulative number of printed sheets of 101,050 sheets) is 10 sheets or less, and hence it is determined that the failure pattern is "successive" from the causal part deduction table of FIG. 12. It is deduced that the causal part is the container drive unit 207, or at least one of the link member 3011 and the link shaft 7001. It is assumed that the user or the CE has performed the maintenance with respect to the link member 3011 and the link shaft 7001 from his or her past experience. In FIG. 17B, the cumulative number of printed sheets of the maintenance M1 is 101,057 sheets.

When the error E4 to be analyzed (cumulative number of printed sheets of 101,060 sheets) occurs within the reoccurrence section after the maintenance M1 (up to the cumulative number of printed sheets of 101,067 sheets), the causal part deduction is performed without immediately masking the related error which has occurred before the maintenance M1. The difference in the cumulative number of printed sheets between the error E4 to be analyzed and the related error E3 is 10 sheets or less, and hence it is determined that the failure pattern is "successive" from the causal part deduction table of FIG. 12. In this case, the CPU 201 deduces that the causal part is the container drive unit 207, or at least one of the link member 3011 and the link shaft 7001. The user or the CE has performed the maintenance of the link member 3011 and the link shaft 7001 in the maintenance M1, and hence the causal part of the error E4 to be analyzed can be easily narrowed down to the remaining container drive unit 207.

FIG. 17C and FIG. 17D show that, after maintenance (maintenance M2) of the container drive unit 207 corresponding to the error E4 to be analyzed, an error E5 to be analyzed (cumulative number of printed sheets of 101,080 sheets) has occurred. The error E5 to be analyzed occurs in the new error section after the elapse of the reoccurrence section after the maintenance M2. FIG. 17E and FIG. 17F show that, when the error E5 to be analyzed has occurred in the new error section after the elapse of the reoccurrence section, the related errors E1, E2, E3, and E4 which have occurred before the maintenance M2 are masked. With the masking of the past related errors E1, E2, E3, and E4, the past related error of the error E5 to be analyzed (cumulative number of printed sheets of 101,080) is determined as "no occurrence." The CPU 201 deduces all of the container drive unit 207, the link member 3011 and the link shaft 7001, and the open/close detection sensor 214 as the causal part.

Figure 18:
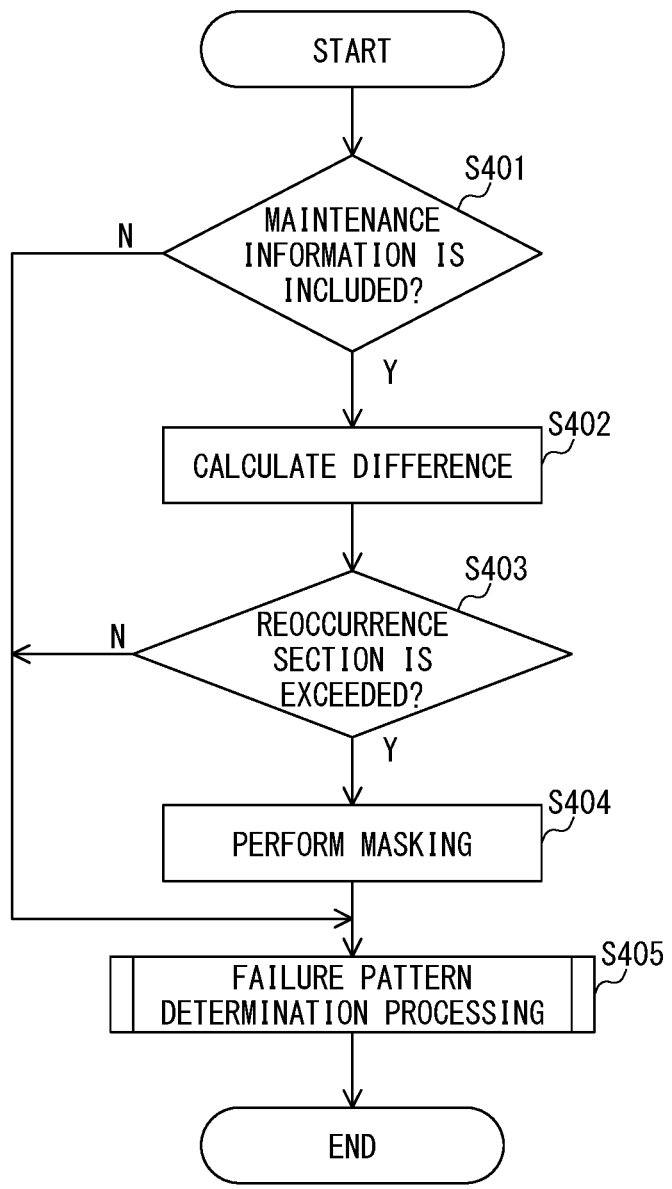
FIG. 18 is an explanatory chart of the masking of the error-related information.

FIG. 18 is a flow chart for illustrating the processing of masking the history of the past related error after the elapse of the reoccurrence section of the maintenance M2. The CPU 201 starts this processing in response to the occurrence of the error E5 to be analyzed.

When the error E5 to be analyzed occurs, the CPU 201 determines whether or not the in-machine data accumulation memory 204 includes the information of maintenance end (maintenance M2) (Step S401). When the information of maintenance end is included (Step S401: Y), the CPU 201 calculates the difference between the counter value (cumulative number of printed sheets) at the time of occurrence of the error E5 to be analyzed and the counter value (cumulative number of printed sheets) of the maintenance M2 (Step S402). The CPU 201 determines whether or not this difference value exceeds the reoccurrence section (here, 10 sheets) (Step S403). When the difference value exceeds the reoccurrence section (Step S403: Y), the CPU 201 masks the error-related information on the related errors E1, E2, E3, and E4 which have occurred in the past before the maintenance M2 (Step S404). The CPU 201 performs the failure pattern determination processing of FIG. 14 after the error-related information is masked (Step S405).

When no information of maintenance end is included (Step S401: N), the CPU 201 performs the failure pattern determination processing of FIG. 14 without masking the error-related information (Step S405). Further, when the difference value does not exceed the reoccurrence section (Step S403: N), the CPU 201 performs the failure pattern determination processing of FIG. 14 without masking the error-related information (Step S405).

As described above, the CPU 201 determines the period in which the error-related information has occurred, which is to be used in the causal part deduction, based on the timing at which the maintenance has been performed. The causal part of the error to be analyzed is deduced based on the error-related information within the period. Specifically, the period is determined so that the error-related information on the related error which has occurred before the maintenance is removed from the deduction of the causal part. The error-related information outside of the period is removed by, for example, masking. The related error occurring after the maintenance is used in the deduction of the causal part. As exemplified in FIG. 10, the error-related information includes the date and time of occurrence of the error. Whether or not the error is within the period is determined based on this date and time of occurrence.

For example, after the maintenance, pieces of error-related information on the error to be analyzed which has occurred before the maintenance, and has become the target of this maintenance, and on the related error thereof are masked. In this manner, the possibility of an erroneous determination of the causal part is reduced. Further, when the reoccurrence section is set after the maintenance and the error to be analyzed of the same error code as that at the time of maintenance occurs during the reoccurrence section, the causal part is deduced without masking the error-related information of the past related error. When no error to be analyzed occurs during the reoccurrence section but the error to be analyzed occurs in the new error section, the causal part deduction is performed with the error-related information obtained before the maintenance being masked. In this manner, the causal part can be easily narrowed down from the plurality of candidates for the causal part. Accordingly, the possibility of an erroneous determination in the deduction of the causal part is reduced.

Modification Example

In the above-mentioned example, there has been described a configuration in which the error-related information is accumulated in the in-machine data accumulation memory 204 in the image forming apparatus 100, and the CPU 201 reads out the error-related information from the in-machine data accumulation memory 204 so as to deduce the causal part. In this example, description is given of a case in which those steps of processing are performed in an information processing apparatus provided externally to the image forming apparatus 100.

Figure 19:
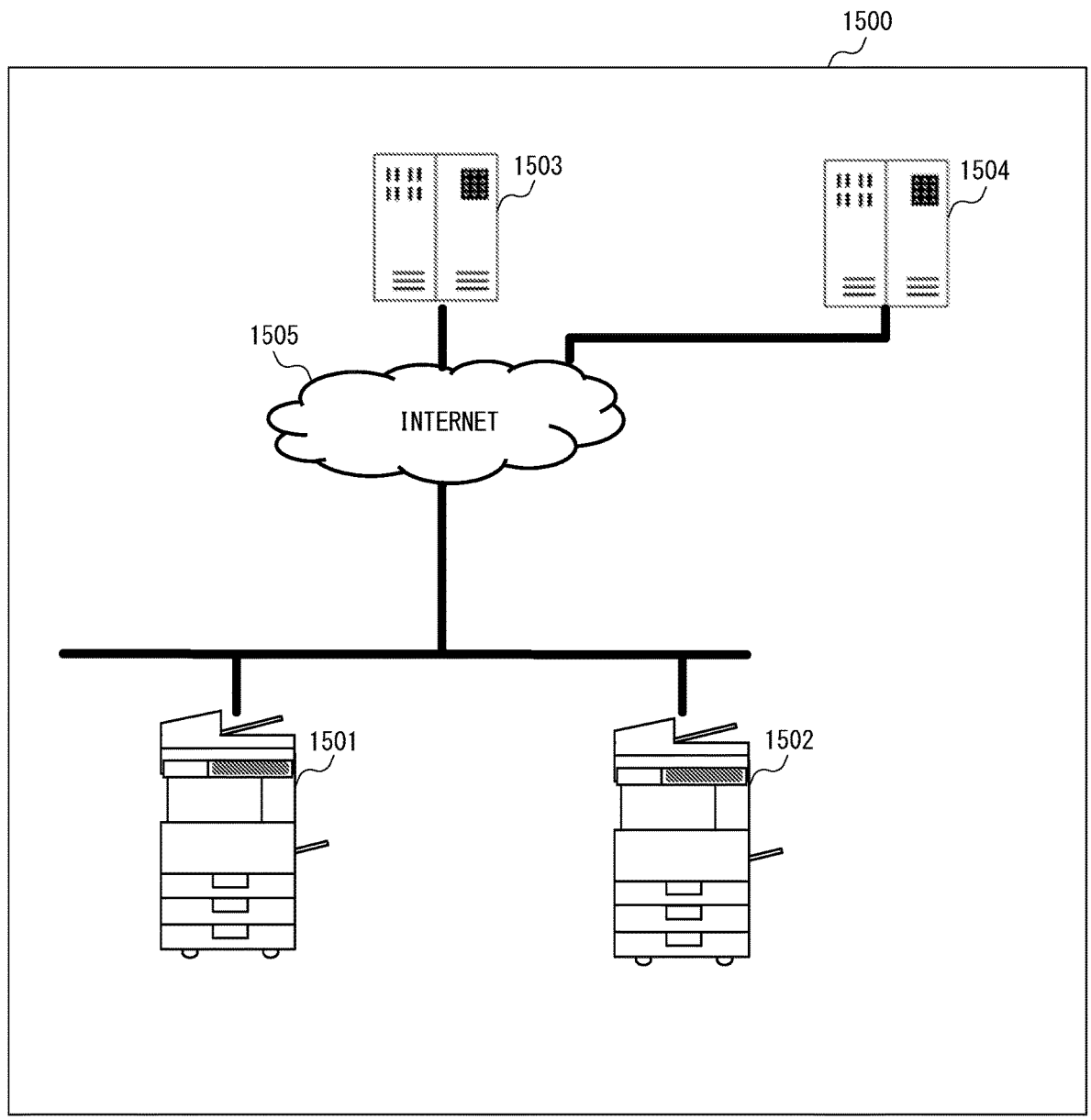
FIG. 19 is a configuration diagram of a causal part deduction system.

FIG. 19 is a configuration diagram of a causal part deduction system for deducing a causal part of the image forming apparatus with an external information processing apparatus. A causal part deduction system 1500 incudes one or more image forming apparatus 1501 and 1502, a server 1503, and a management apparatus 1504. Here, two image forming apparatus 1501 and 1502 are provided in the causal part deduction system 150 as an example. The image forming apparatus 1501 and 1502 each have a configuration in which a network interface is added to the image forming apparatus 100, and create a printed product by forming an image on the sheet S. The server 1503 and the management apparatus 1504 function as the information processing apparatus for deducing the causal part based on the in-machine data. In place of the in-machine data accumulation memory 204 described in the above-mentioned example, the server 1503 functions as a storage device for storing (accumulating) the in-machine data.

The image forming apparatus 1501 and 1502, the server 1503, and the management apparatus 1504 are capable of communicating with each other via a network. Here, the network is an Internet 1505. The network may be a telecommunication line, such as a local area network (LAN) or a wide area network (WAN). The causal part deduction system 1500 collects data from each of the image forming apparatus 1501 and 1502 and deduces a cause of a failure in each of the image forming apparatus 1501 and 1502 based on the collected data.

When an error and maintenance occur in each of the image forming apparatus 1501 and 1502, each of the image forming apparatus 1501 and 1502 transmits to the server 1503 the error-related information and the maintenance-related information on the error and the maintenance which have occurred.

The server 1503 accumulates the error-related information and the maintenance-related information which are pieces of the in-machine data acquired from each of the image forming apparatus 1501 and 1502, for each of the image forming apparatus 1501 and 1502 from which the pieces of information are acquired. Further, the server 1503 transmits to the management apparatus 1504 the received error-related information and maintenance-related information, and the error-related information and maintenance-related information on an error and maintenance which have occurred in the same image forming apparatus in the past.

Figure 20:
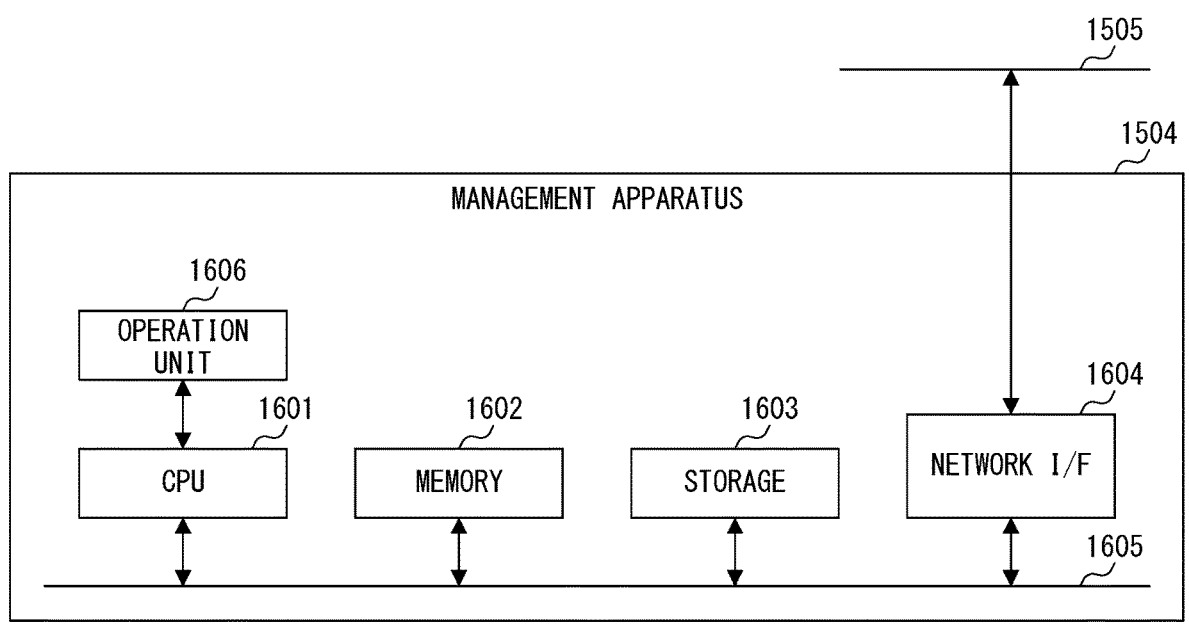
FIG. 20 is a configuration diagram of a management apparatus.

FIG. 20 is a configuration diagram of the management apparatus 1504. The management apparatus 1504 includes a CPU 1601, a memory 1602, a storage 1603, a network interface (I/F) 1604, and an operation unit 1606. The CPU 1601, the memory 1602, the storage 1603, and the network I/F 1604 are connected to each other via a system bus 1605 so as to be capable of communicating with each other.

The CPU 1601 controls overall operation of the management apparatus 1504. The memory 1602 stores a starting program of the CPU 1601 and data required for execution of the starting program. The storage 1603 is a storage device with a larger capacity than that of the memory 1602, and is, for example, a hard disk drive (HDD), a solid state drive (SDD), or the like. The storage 1603 stores a control program or the like to be executed by the CPU 1601.

The CPU 1601 executes the starting program stored in the memory 1602 at a start-up of the management apparatus 1504. The starting program is a program for loading the control program stored in the storage 1603 into the memory 1602. The CPU 1601 executes the control program loaded into the memory 1602, and performs various kinds of control. Further, the CPU 1601 communicates with another apparatus such as the server 1503 via the Internet 1505 by using the network I/F 1604. The operation unit 1606 has a function similar to that of the operation unit 205. The operation unit 1606 inputs an instruction to display a causal part deduction result to the CPU 1601. Moreover, the operation unit 1606 displays the causal part deduction result under the control of the CPU 1601.

The CPU 1601 executes the processing of FIG. 13, FIG. 14, FIG. 16C, and FIG. 18 so as to deduce the causal part based on the error-related information and maintenance-related information received from the server 1503. The CPU 1601 transmits the deduction result of the causal part to the server 1503. The server 1503 stores the received deduction result of the causal part.

When the instruction to display the causal part deduction result is input through the operation unit 1606, the CPU 1601 acquires the deduction result of the causal part from the server 1503, and displays the information on the causal part onto the operation unit 1606. The CPU 1601 may display not only the causal part but also maintenance-related information as well on the operation unit 1606. The maintenance-related information is, for example, a component replacement procedure or a rough work time period required for maintenance. As described above, the causal part of the image forming apparatus 1501 and 1502 serving as a management target of the causal part deduction system 1500 is deduced, and the maintenance work is performed.

In the image forming apparatus 100 and the causal part deduction system 1500 of the embodiments described above, after the maintenance of the causal part, the past error-related information on this causal part is masked. In this manner, the past error-related information on this causal part cannot be used in the deduction of the causal part thereafter. Accordingly, the possibility that the causal part already subjected to maintenance is erroneously given as a candidate for the causal part again is reduced. Moreover, the reoccurrence section is provided after the maintenance, and the past error-related information is masked after the elapse of the reoccurrence section. In this manner, the causal part can be easily narrowed down even when there are a plurality of candidates for the causal part. Thus, needless maintenance work can be reduced.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Application No. 2022-166716, filed Oct. 18, 2022, which is hereby incorporated by reference herein in its entirety.

What is claimed is:

1. An information processing apparatus for communicating with a database storing information on errors which have occurred in an image forming apparatus, wherein the information processing apparatus comprising:
 a controller configured to:
  acquire, from the database, information on an error to be analyzed and information on a related error which occurred before an occurrence of the error to be analyzed; and
  determine a causal part being a cause of the error to be analyzed, based on error timing information related to a timing of occurrence of the error to be analyzed and error timing information related to a timing of occurrence of the related error,
   wherein in a case where, after maintenance has been performed to solve a first error to be analyzed, a second error to be analyzed of a same type as the first error to be analyzed has occurred, the controller determines a period before a time of an occurrence of the second error to be analyzed, the second error to be analyzed being for use in determination of a causal part that has caused the second error to be analyzed, based on a timing at which the maintenance is performed; and determine the causal part being the cause of the second error to be analyzed based on error timing information related to a timing of occurrence of the related error occurring within the determined period.

2. The information processing apparatus according to claim 1, wherein the controller is configured to determine, in a case where the second error to be analyzed has occurred after the maintenance has been performed in order to solve the first error to be analyzed, the causal part being the cause of the second error to be analyzed without using the error timing information related to a timing of occurrence of the related error occurring before the maintenance and the error timing information related to a timing of occurrence of the first error to be analyzed.

3. The information processing apparatus according to claim 2, wherein the controller is configured to determine, in a case where the second error to be analyzed has occurred before elapse of a grace period from end of the maintenance, the causal part being the cause of the second error to be analyzed based on the error timing information related to the timing of occurrence of the related error and the error timing information related to the timing of occurrence of the first error to be analyzed.

4. The information processing apparatus according to claim 3, wherein the controller is configured to determine, in a case where the second error to be analyzed has occurred after the elapse of the grace period, the causal part being the cause of the second error to be analyzed without using the error timing information related to the timing of occurrence of the related error and the error timing information related to the timing of occurrence of the first error to be analyzed.

5. The information processing apparatus according to claim 1, wherein, in the database, maintenance end information indicating that the maintenance has been performed is to be stored, and wherein the controller is configured to determine, using the maintenance end information stored in the database, the causal part being the cause of the second error to be analyzed without using the error timing information related to a timing of occurrence of the related error occurring before the maintenance and the error timing information related to a timing of occurrence of the first error to be analyzed, which are stored in the database.

6. The information processing apparatus according to claim 5, wherein each of the error timing information and the maintenance end information further includes a counter value indicating a cumulative number of printed sheets of the image forming apparatus, and wherein the controller is configured to:

determine, based on the counter value, whether a grace period has elapsed from end of the maintenance;

determine, when the second error to be analyzed has occurred before elapse of the grace period, the causal part being the cause of the second error to be analyzed through use of the error timing information related to the timing of occurrence of the related error and the error timing information related to the timing of occurrence of the error to be analyzed; and determine, when the second error to be analyzed has occurred after the elapse of the grace period, the causal part being the cause of the second error to be analyzed without using the error timing information related to the timing of occurrence of the related error occurring before the maintenance and the error timing information related to the timing of occurrence of the error to be analyzed.

7. The information processing apparatus according to claim 6, wherein the controller is configured to determine whether the grace period has elapsed based on a difference between the counter value of the maintenance end information and the counter value of the error timing information related to a timing of occurrence of the second error to be analyzed.

8. An image forming apparatus comprising:

a memory in which information on errors which have occurred in the image forming apparatus and error timing information related to a timing of occurrence of each of the errors are to be stored; and a controller configured to:

read out, from the memory, information on an error to be analyzed and information on a related error which has occurred before an occurrence of the error to be analyzed; and determine a causal part being a cause of the error to be analyzed, based on error timing information related to a timing of occurrence of the error to be analyzed and error timing information related to a timing of occurrence of the related error, wherein the controller is configured to:

determine, in a case where, after maintenance has been performed in order to solve a first error to be analyzed, a second error to be analyzed which is an error of a same type as the first error to be analyzed has occurred, the controller determines a period before a time of an occurrence of the second error to be analyzed, the second error to be analyzed being for use in determination of a causal part that has caused the second error to be analyzed, based on a timing at which the maintenance is performed; and determine the causal part being the cause of the second error to be analyzed based on error timing information related to a timing of occurrence of the related error occurring within a determined period.

9. A notification method of giving a notification of a causal part being a cause of an error which has occurred in an image forming apparatus, the notification method comprising:

selecting information on an error to be analyzed from a database storing information on errors which have occurred in the image forming apparatus;

determining whether maintenance has been performed in order to solve the errors which have occurred in the image forming apparatus;

determining, in a case where the maintenance has been performed in order to solve an error of a same type as the error to be analyzed before a timing of occurrence of the error to be analyzed, a threshold period occurring before the timing of occurrence of the error to be analyzed and is to be used in determination of a causal part being a cause of the error to be analyzed;

acquiring information on a related error occurring in the threshold period, from the database; and giving a notification of the causal part being the cause of the error to be analyzed, based on error timing information related to the timing of occurrence of the error to be analyzed and error timing information related to a timing of occurrence of the related error.

10. The notification method according to claim 9, wherein, in a case where the error to be analyzed has occurred after the maintenance has been performed in order to solve the error of the same type as the error to be analyzed, the giving a notification of the causal part being the cause of the error to be analyzed is performed without using the error timing information related to a timing of occurrence of the related error occurring before the maintenance.

11. The notification method according to claim 10, wherein, in a case where the error to be analyzed has occurred before elapse of a grace period from end of the maintenance, the giving a notification of the causal part being the cause of the error to be analyzed is performed based on the error timing information related to the timing of occurrence of the related error, through use of the error timing information related to a timing of occurrence of the error of the same type as the error to be analyzed.

12. The notification method according to claim 11, wherein, in a case where the error to be analyzed has occurred after the elapse of the grace period, the giving a notification of the causal part being the cause of the error to be analyzed is performed without using the error timing information related to the timing of occurrence of the related error and the error timing information related to the timing of occurrence of the error of the same type as the error to be analyzed.

13. The notification method according to claim 9, wherein, in the database, maintenance end information indicating that the maintenance has been performed is to be stored, and
wherein, using the maintenance end information stored in the database, the giving a notification of the causal part being the cause of the error to be analyzed is performed without using the error timing information related to a timing of occurrence of the related error occurring before the maintenance and the error timing information related to a timing of occurrence of the error of the same type as the error to be analyzed, which are stored in the database.

14. The notification method according to claim 13, wherein each of the error timing information and the maintenance end information further includes a counter value indicating a cumulative number of printed sheets of the image forming apparatus, and
wherein the notification method further comprises:
determining, based on the counter value, whether a grace period has elapsed from end of the maintenance;
giving, in a first case where the error to be analyzed has occurred before elapse of the grace period, the notification of the causal part being the cause of the error to be analyzed based on the error timing information related to the timing of occurrence of the related error and the error timing information related to the timing of occurrence of the error to be analyzed; and
giving, in a second case where the error to be analyzed has occurred after the elapse of the grace period, the notification of the causal part being the cause of the error to be analyzed without using the error timing information related to the timing of occurrence of the related error occurring before the maintenance and the error timing information related to the timing of occurrence of the error to be analyzed.

15. The notification method according to claim 14, wherein the determining whether a grace period has elapsed is performed based on a difference between the counter value of the maintenance end information and the counter value of the error to be analyzed.

* * * * *